United States Patent
Sonnek et al.

(10) Patent No.: US 11,889,943 B2
(45) Date of Patent: Feb. 6, 2024

(54) AXIALLY OPERABLE BREWING SYSTEM

(71) Applicant: BUNN-O-MATIC CORPORATION, Springfield, IL (US)

(72) Inventors: Tom Sonnek, Springfield, IL (US); Matthew P. Rutledge, Springfield, IL (US); Joel Morton, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 751 days.

(21) Appl. No.: 17/048,882

(22) PCT Filed: Apr. 19, 2019

(86) PCT No.: PCT/US2019/028367
§ 371 (c)(1),
(2) Date: Oct. 19, 2020

(87) PCT Pub. No.: WO2019/204759
PCT Pub. Date: Oct. 24, 2019

(65) Prior Publication Data
US 2021/0235919 A1 Aug. 5, 2021

Related U.S. Application Data

(60) Provisional application No. 62/660,085, filed on Apr. 19, 2018.

(51) Int. Cl.
*A47J 31/36* (2006.01)
*A47J 31/46* (2006.01)
(Continued)

(52) U.S. Cl.
CPC ............. *A47J 31/3614* (2013.01); *A23F 5/26* (2013.01); *A47J 31/002* (2013.01);
(Continued)

(58) Field of Classification Search
CPC ........ A47J 31/46; A47J 31/461; A47J 31/469; A47J 31/002; A47J 31/4403; A47J 31/44;
(Continued)

(56) References Cited

U.S. PATENT DOCUMENTS

| 5,393,540 A | 2/1995 | Bunn et al. |
| 5,650,186 A | 7/1997 | Annoni et al. |

(Continued)

FOREIGN PATENT DOCUMENTS

DE 3316157 11/1984

OTHER PUBLICATIONS

Search Report & Written Opinion issued in Intl Appl. No. PCT/US2019/028367 (2019).

*Primary Examiner* — Hong T Yoo
(74) *Attorney, Agent, or Firm* — Barnes & Thornburg LLP

(57) ABSTRACT

A system, method, and apparatus for producing a brewed beverage using a brewing apparatus of a brewing machine to reduce the time to produce a brewed beverage through a sequence of steps. The apparatus includes structures and functions that help to maintain the reliability and cleanliness of the apparatus. The structure of the apparatus helps reduce the size and dimension of the apparatus while producing a desired brewed beverage result. The steps of the method configured using the apparatus to sequence and/or simultaneously operate various steps of the apparatus to reduce the time to produce a brewed beverage.

2 Claims, 20 Drawing Sheets

(51) Int. Cl.
  *A23F 5/26* (2006.01)
  *A47J 31/00* (2006.01)
  *A47J 31/52* (2006.01)
(52) U.S. Cl.
  CPC ......... *A47J 31/3619* (2013.01); *A47J 31/461* (2018.08); *A47J 31/469* (2018.08); *A47J 31/52* (2013.01)
(58) Field of Classification Search
  CPC ...... A47J 31/3619; A47J 31/00; A47J 31/465; A47J 31/18; A47J 31/24; A47J 31/36; A47J 31/3604; A47J 31/3614; A47J 31/34; A47J 31/40; A47J 31/52; A47J 31/467
  See application file for complete search history.

(56) References Cited

U.S. PATENT DOCUMENTS

| | | |
|---|---|---|
| 2003/0116026 A1 | 6/2003 | Koning et al. |
| 2012/0100275 A1 | 4/2012 | Bishop et al. |

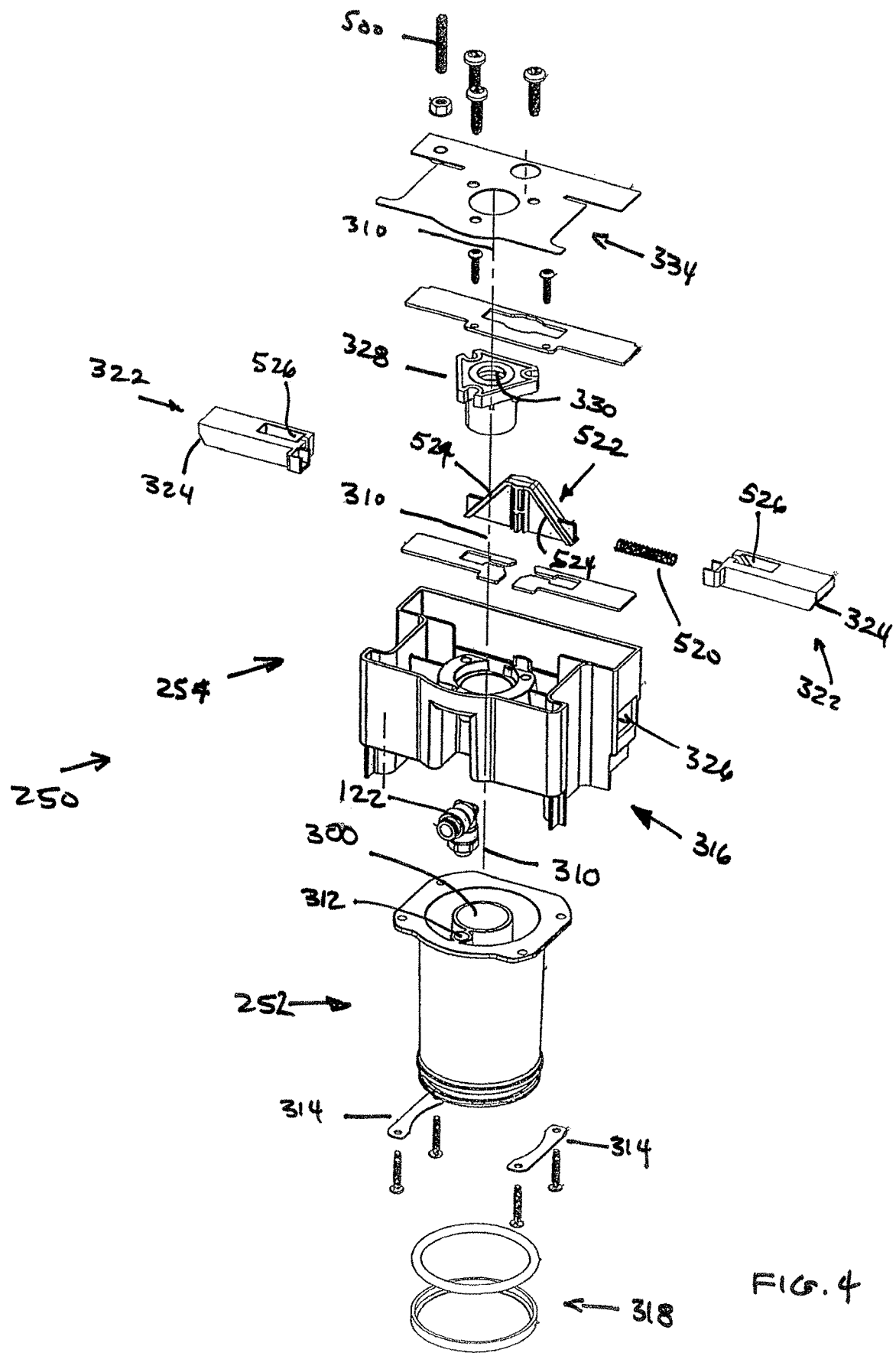

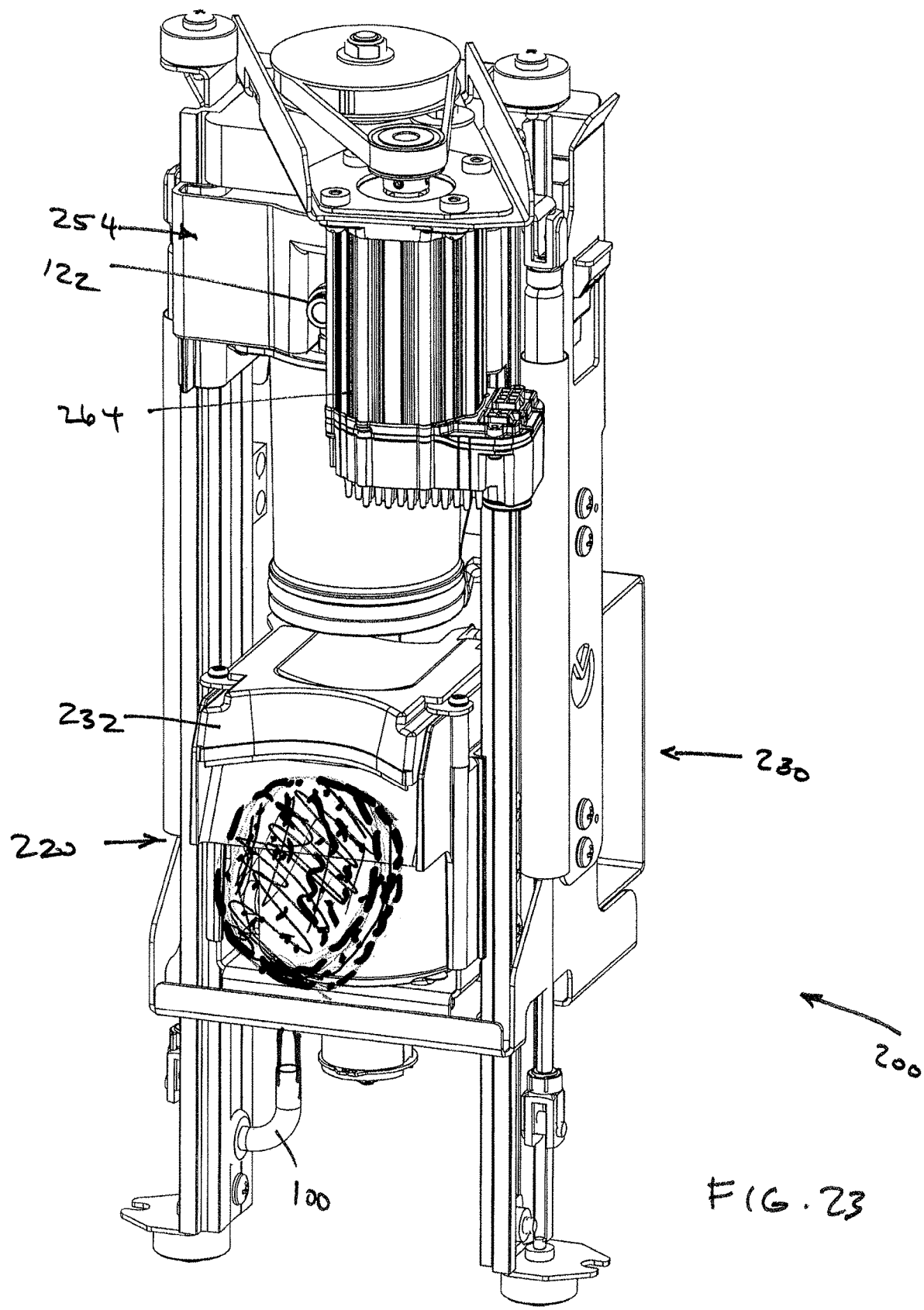

AXIALLY OPERABLE BREWING SYSTEM

CROSS REFERENCE TO RELATED APPLICATIONS

This application is a U.S. nationalization under 35 U.S.C. § 371 of International Application No. PCT/US2019/028367, filed 19 Apr. 2019, which claims the benefit of priority under 35 U.S.C. § 119(e) to U.S. Provisional Patent Application No. 62/660,085, filed 19 Apr. 2018. The disclosures set forth in the referenced applications are incorporated herein by reference in their entireties.

BACKGROUND

The present invention relates to a beverage brewing apparatus of a beverage machine for use in the production of a brewed beverage such as coffee. A variety of apparatus have been developed for the production of coffee freshly brewed from freshly ground coffee beans. The present invention improves a variety of aspects of such apparatus including quickly and efficiently brewing fresh coffee from fresh coffee beans, helping maintain cleanliness within the apparatus, improving reliability of the apparatus, as well as other controls and features.

SUMMARY

In illustrative embodiments, a beverage brewing machine has a housing containing a beverage brewing apparatus. The beverage brewing apparatus provides mechanisms to function in a sequence of steps and/or simultaneous steps to minimize the time for producing a beverage from beverage brewing substance. The brewing apparatus has a brew chamber for receiving water and beverage brewing substance. An upper piston is sized and configured for controllable movement into and out of the brewing chamber during a brewing cycle. A drive mechanism is operatively coupled to the upper piston and a controller for controllably operating the upward and downward movement of the upper piston. A vent valve communicates with the brewing chamber and is coupled to a controller for controllably opening and closing the vent valve during a brewing cycle. A heated water system is coupled to and communicates with the brew chamber for controllably delivering water to the brew chamber during at least a portion of the brewing cycle. A brew chamber dispense valve is coupled to and communicates with the brew chamber for controllably opening and closing a passage from the brew chamber for dispensing of brewed beverage therefrom. The system operates by positioning the upper piston at the start of a brew cycle out of the brew chamber to allow beverage brewing substance to be dispensed into the brew chamber. When the brew cycle is started, water is controllably delivered from the water system to the brew chamber simultaneously with the dispensing of brewing substance into the brew chamber to facilitate distribution and wetting of the brewing substance. At the conclusion of dispensing the brewing substance into the chamber, the piston is moved downwardly into the brew chamber to seal the brew chamber. Continued dispensing of heated water into the brew chamber occurs until a predetermined volume of water is achieved for use in at least partially saturating the brewing substance to facilitate extraction of brew therefrom. The piston is moved slightly upwardly in the brew chamber to provide volume within the sealed chamber for movement of the combination of water and brewing substance. Continued dispensing of heated water into the brew chamber initiates movement of brewed beverage out of the brew chamber through a dispensing line for dispensing to a container. After conclusion of the brewing cycle the combination of brewing substance and water is compressed to extract beverage therefrom and at least partially drain the brewing substance for subsequent disposal.

In illustrative embodiments, a method for operating a beverage brewing machine including an apparatus for brewing beverage within the machine. The apparatus operating with the following sets using the structures of the apparatus. Providing a brewing chamber and a controllably moveable upper piston moveable into and out of the brewing chamber. A drive mechanism is provided and coupled to the upper piston and a controller for controllably operating the upward and downward movement of the upper piston. A heated water delivery system is coupled to the controller for controllably delivering heated water to the brew chamber and a vent valve coupled to and controllably communicating with the brew chamber and coupled to the controller for providing a path between the inside of the brew chamber and ambient atmosphere. A controllable dispense valve is provided and coupled to and controllably communicating with the brew chamber and coupled to the controller for controllably dispensing brewed beverage from the chamber. A brew chamber fill valve is coupled to and controllably communicates with the brew chamber and is coupled to the controller for delivering water from the water system to the brewed chamber. A filter portion of the upper piston is provided for filtering brewed beverage from brewing substance retained in the brewing chamber for extracting brewed beverage during a brewing cycle. A lower piston is controllably moveable through the brew chamber for facilitating movement of at least beverage brewing substance during a portion of the brewing cycle. A brewing substance delivery assembly is coupled to the controller for delivering brewing substance to the brew chamber for use in a brewing cycle. The system initiates a brewing cycle using the controller and simultaneously operating the controllable fill valve to introduce heated water into the brewing chamber while dispensing beverage brewing substance into the brewing chamber. The system simultaneously ceases dispensing of brewing substance into the brewing chamber and operating the upper piston to move into the brewing chamber and seal the brewing chamber while retaining the vent valve in an open condition. The system moves the upper piston into the brewing chamber to a predetermined level while simultaneously controllably filling the brewing chamber with additional water. Then the system operates the vent valve to close the brewing chamber communication with ambient atmosphere while continuing the dispensing of heated water into the brewing chamber and dispensing brewed beverage from the brewing chamber through a dispense line. Brewed beverage is dispensed to a container. A drain valve is provided and coupled to and controllably communicating with the brew chamber. The drain valve is maintained in a closed position during the brewing cycle. After a predetermined volume of water has been dispensed through the brewing chamber for combination with the brewing substance the fill valve is operated to a closed position to cease dispensing water into the brewing chamber. During the process of saturating the brewing substance with water, while maintaining the vent valve closed in at least momentarily stopping the flow of water into the brewing chamber by operating the fill valve to a closed position, the piston is controllably operated upwardly in the brewing chamber to draw a vacuum within the brewing chamber to facilitate extraction of flavor and other characteristics from the brewing substance into the heated water to enhance the brewing process. After a predetermined time during which the vacuum is imposed on the brewing chamber and its contents, the dispense valve is controllably opened and at least the piston is driven downwardly into the chamber to extract brewed beverage form the combination of brewing substance and heated water. At the end of a predetermined volume of water dispensed through the brewing chamber driving the upper piston downwardly to squeeze the contents of the brewing chamber against a lower piston to extract additional brewed beverage therefrom. Controllably operating the dispense valve to a closed position and operating the upper piston and lower piston upwardly to move the used brewing substance from the brewing cycle to a position where it can be removed from the brewing chamber. Providing an ejection assembly for moving the spent brewing substance away from the brewing chamber. After removing the spent brewing substance returning the upper piston to a position clear of the path through which brewing substance is dispensed into the brewing chamber for receiving brewing substance into the brewing chamber for the next brewing cycle.

BRIEF DESCRIPTION OF THE DRAWINGS

The present disclosure will be described hereafter with reference to the attached drawings which are given as a non-limiting example only, in which:

FIG. 4 is an enlarged exploded view of the upper piston assembly including the latch assembly and the upper piston carried on the latch assembly;

FIG. 23 is a perspective view showing the swipe mechanism in the forward most position after displacing and removing the puck from the apparatus.

DETAILED DESCRIPTION

Figure 1:
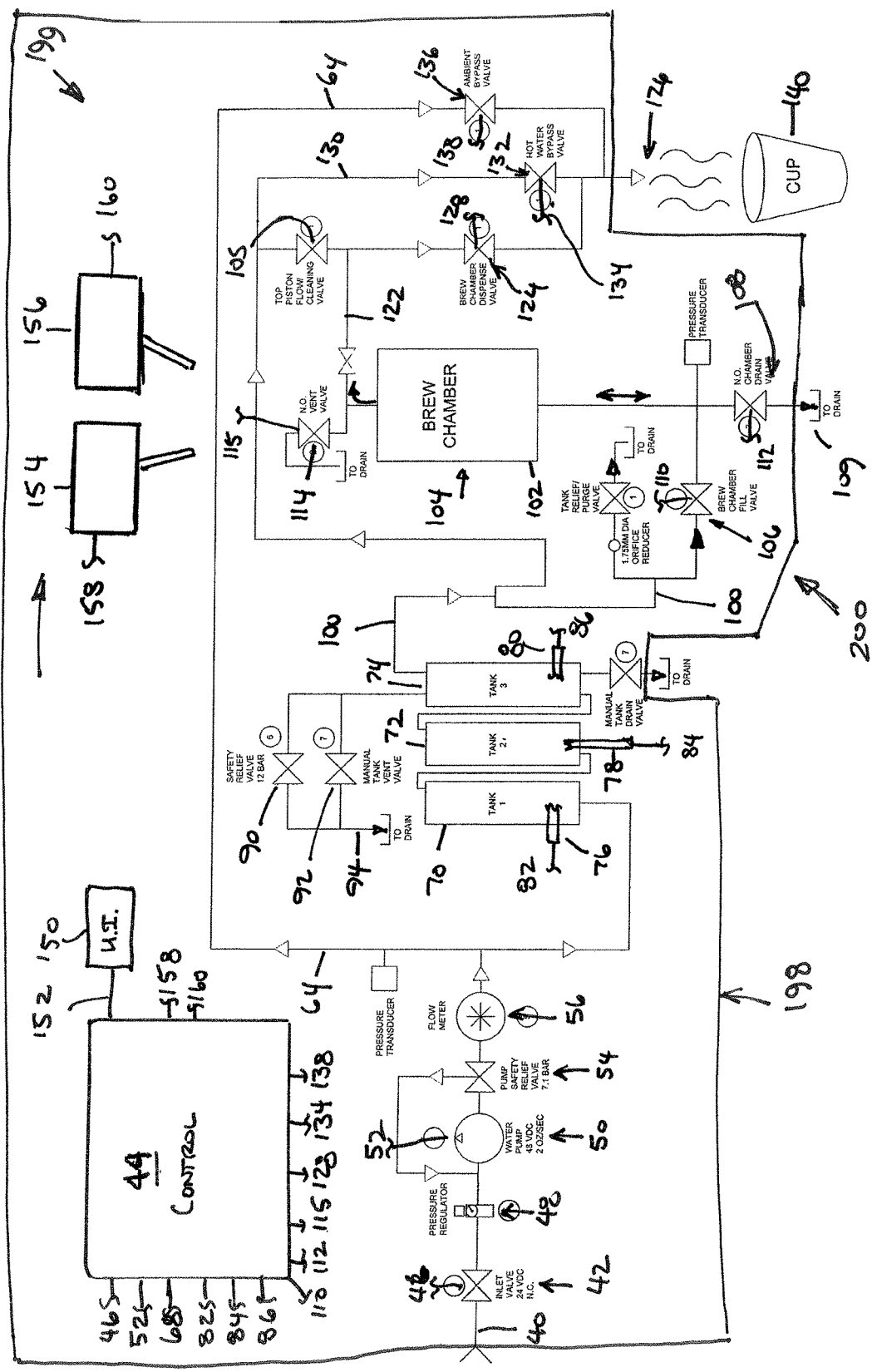
FIG. 1 is a schematic showing the configuration and operation of the system used with the apparatus described and illustrated in other figures.

While the present disclosure may be susceptible to embodiment in different forms, there is shown in the drawings, and herein will be described in detail, embodiments with the understanding that the present description is to be considered an exemplification of the principles of the disclosure. The disclosure is not limited in its application to the details of structure, function, construction, or the arrangement of components set forth in the following description or illustrated in the drawings. The disclosure is capable of other embodiments and of being practiced or of being carried out in various ways. In addition, it is to be understood that the phraseology and terminology used herein is for the purpose of description and should not be regarded as limiting. The use of various phrases and terms is meant to encompass the items or functions identified and equivalents thereof as well as additional items or functions. Unless limited otherwise, various phrases, terms, and variations thereof herein are used broadly and encompass all variations of such phrases and terms. Furthermore, and as described in subsequent paragraphs, the specific configurations illustrated in the drawings are intended to exemplify embodiments of the disclosure. However, other alternative structures, functions, and configurations are possible which are considered to be within the teachings of the present disclosure. Furthermore, unless otherwise indicated, the term "or" is to be considered inclusive.

Terms including beverage, brewed, brewing, brewing substance, brewed liquid, and brewed beverage as may be used herein are intended to be broadly defined as including, but not limited to, the brewing of coffee, tea, and other beverages. This broad interpretation is also intended to include, but is not limited to any process of dispensing, infusing, steeping, reconstituting, diluting, dissolving, saturating or passing a liquid through or otherwise mixing or combining a brewing substance with a liquid such as water without limitation to the temperature of such liquid unless specified. This broad interpretation is also intended to include, but is not limited to, brewing substances such as ground coffee, tea, liquid beverage concentrate, powdered beverage concentrate, flaked, granular, freeze dried, or other forms of materials including liquid, gel, crystal, or other forms of beverage or food materials to obtain a desired beverage or other food product. Beverage brewing substances will be described in the present application and generally will be referred to as "coffee". However, it should be understood that the term brewing substance should be broadly interpreted regardless of reference to brewing substance or coffee.

The foregoing terms as well as other terms should be broadly interpreted throughout this application to include all known as well as all hereafter discovered versions, equivalents, variations, and other forms of the abovementioned terms as well as other terms. The present disclosure is intended to be broadly interpreted and not limited.

While the present disclosure describes various exemplary embodiments, the disclosure is not so limited. To the contrary, the disclosure is intended to cover various modifications, uses, adaptations, and equivalent arrangements based on the principles disclosed. Further, this application is intended to cover such departures from the present disclosure as come within at least the known or customary practice within the art to which it pertains. It is envisioned that those skilled in the art may devise various modifications and equivalent structures and functions without departing from the spirit and scope of the disclosure as recited in the following claims. The scope of the following claims is to be accorded the broadest interpretation to encompass all such modifications and equivalent structures and functions.

One embodiment of the present invention as shown in the schematic illustration of FIG. 1 the apparatus is configured with a water inlet line 40, which controllably admits water to the system using an inlet valve 42. The valve 42 is coupled to a controller 44 over line 46. A pressure regulator 48 is provided on the inlet line 40 and a water pump 50 coupled to the controller over line 52 facilitates maintaining pressure on the line. A pump safety valve 54 is provided along with a flow meter 56. The inlet water line provides two paths, one path 60 delivering water to a heated water tank assembly 62, the other path leading to an ambient water bypass line 64. As will be described in greater detail below the bypass line is controlled with a bypass valve 66 coupled to the controller over line 68.

The inlet water line feeding the heated water tank assembly 62 is introduced into at least one tank 70 and, as shown, a series of multiple tanks 70, 72, 74. Water is controllably heated using heating devices 76, 78, 80 coupled to the controller over corresponding lines 82, 84, 86. Each of the tanks can be used to add energy to the water thereby progressively heating water for use during the brewing process. This series of tanks 70, 72, 74 helps to provide maintenance of water at and faster recovery of water to a predetermined temperature or within a predetermined temperature operating range for use in the brewing process. A safely relief valve 90 and tank vent valve 92 are provided and coupled to the last tank 74 in the series of tanks and provide a drain line 94 to the drain for any excess flow of water or venting of air from the system.

Water is controllably dispensed through a heated water dispensing line 100 through the lower portion 102 of a brew chamber 104. These paths, control elements and other related features will be described generally with regard to the schematic in the present portion of the description. Additional detail will be described with regard to specific structures with reference to the remainder of the Figures to be provided below. The heated water dispense line includes a controllable brew chamber fill valve 106 and a normally open chamber drain valve 108. The fill valve 106 is coupled over line 110 to the controller 44 as well as the chamber drain valve 108 being coupled to the controller 44 over line 112.

During the brewing process, an upper vent valve 114 is maintained in the normally open position to allow air within the chamber to be vented to atmosphere. Water is controllably introduced by opening the inlet valve 42 on the inlet line to displace water in the heated water tank assembly 62. The brew chamber fill valve 106 is controllably opened and the normally open drain valve 108 is controllably closed to direct water upwardly through a lower piston in the brew chamber 104. Water 120 introduced into the brew chamber 104 is mixed with coffee retained within the chamber. In additional steps to be described below, coffee that is brewed within the brew chamber 104 is dispensed upwardly through the filter 340 to a dispense line 122. A dispense valve 123 is provided on the dispense line 122 for controllably dispensing coffee through the dispense line 122 to a dispense nozzle 126. The dispense valve 124 is coupled to the controller 44 over line 128.

In addition to the features of the heated water dispensing line 100 and coffee dispensing line 122 a heated water bypass line 130 and controllable hot water bypass valve 132 (controlled over line 134 by the controller 44) and the ambient water bypass line 64 and ambient control valve 136 (controlled over line 138 coupled to the controller 44) are provided to provide heated or ambient bypass water. The bypass lines 130, 64 are brought together at the dispensing nozzle 126 for combination with the dispensed coffee. In this regard, the mixing of the bypass water can be made at the dispensing point so that there is no appearance of separate flow paths to the consumer receiving their beverage at a container or cup 140.

A general description of some of the overall system including components, connections, and controls has been provided. Additional specific steps in the process are herein described. One of the aspects of the present invention is the timing of the various steps of the brewing process using the structures and specific functions of the apparatus to help decrease the brew time from initiating the brew cycle, such as press of a start button or feature, until the completion of dispensing of coffee into a cup 140.

Additionally, the system includes at least one 154 and optionally, multiple 156 hopper grinders which retain a quantity of fresh coffee beans for on demand grinding. The hopper grinders 154, 156 are coupled over control lines 158, 160 coupled to the controller 44. The hopper grinders 154, 156 are controllably operated by the controller 44 to dispense a predetermined quantity of ground coffee into the brew chamber 104. The hopper grinders could also be configured as hoppers only for dispensing preground coffee (hence not needing the grinder portion of the assembly into the brew chamber. The hopper grinders may be configured to be positioned within the housing 198 of the overall machine 199, partially within the housing or external to the housing. Multiple grinders may be used in the situation in which a regular coffee is provided along with a decaf coffee bean choice. These beans can be maintained separate in separate grinders to be ground on demand for the brewing process. The grinders can be provided with individual grinder assemblies or can use a single grinder assembly with each type of bean being controllably fed to the grinder assembly.

A user interface 150 is provided and coupled to the controller 44 over line 152. In addition to controlling the on-off functions and other features of the system and apparatus, the user interface 150 can be used to program features or other recipes into the controller 44 of the system. During one embodiment of a brewing process, the user operates the user interface to select the type of bean to be used in the process that initiates the brewing cycle. The user operates the system at the user interface 150 by selecting, for example, type of coffee, volume of coffee to be produced or cup size, and "start". Having received this basic information, the controller 44 initiates the brewing cycle by grinding coffee from one of the grinder assemblies 154, 156. Ground coffee is dispensed into the brew chamber 104. Generally, simultaneously with the dispensing of coffee into the brew chamber 104 heated water is dispensed into the chamber to provide wetting of the ground, some float of the freshly ground coffee on top of the water and some distribution of the coffee to prevent clumping or mounding of the coffee in the center of the chamber. The dispensing of water can start as soon as the user presses "start", before ground coffee starts to fall into the chamber, further reducing the total brew time.

It is preferable to prevent clumping or mounding of coffee within the chamber and provide a generally even bed depth of coffee in the chamber to more efficiently utilize the volume of coffee dispensed. The amount of coffee dispensed into the brew chamber is calibrated for the volume of coffee beverage to be produced. Usually, a larger volume of brew coffee will require more coffee grounds in accordance with established ratios of coffee and water. During the dispensing of ground coffee and water into the brew chamber 104 the vent valve 114 is maintained in the normally open position to vent the dispensed line 122 and brew chamber 104 to ambient. As will be described in greater detail below, an upper piston is operated to close the brew chamber 104.

Additional water can be introduced through the heated water line after the initial float to pre-infuse the coffee in the brew chamber 104. At this point in the brewing cycle the flow of water can be stopped by operating the fill valve 106 to a closed position. This will allow the coffee and water to steep for a predetermined time to saturate and infuse the ground coffee with water. After a predetermined dwell time, the vent valve 114 is closed, using control line 115, coupled to the controller 44 and the fill valve 106 is opened to introduce additional heated water to the brew chamber 104. Since the top of the brew chamber 104 is sealed, the dispense valve 124 can be operated over line 128 from the controller 44 to receive brewed coffee through the dispensed line 122. Generally, unless bypass water is needed, the hot water bypass valve 134 and ambient bypass water valve 136 are maintained in a closed position. Similarly, the cleaning valve 105 is maintained in a closed position. This configuration of open valves and closed valves provides a path for coffee to flow from the brew chamber 104 to the cup 140.

After a predetermined volume of coffee has been dispensed, calculated by the introduction of a predetermined volume of heated water through the heated water line 100, the brew chamber fill valve 106 is closed, the chamber drain valve 108 is maintained closed, the vent valve 114 is maintained closed and the dispense valve 124 is maintained open. With this configuration of valves and vents, an upper piston 252 is urged downwardly through the brew chamber 104 to continue to dispense remaining beverage from the brew chamber 104 and provide some predetermined degree of compression on the coffee grounds in the brew chamber to squeeze or extract additional coffee from the chamber. The flow of coffee is maintained generally continuous, and generally unnoticeable to the consumer waiting for the cup of coffee, after shutting the fill valve 106 by the movement of the piston 252 and compression of the grounds pushing coffee through the dispensed line 122 and into the cup 140.

After a predetermined degree of compaction, time, and/or other detected or controlled characteristic, the movement of the upper piston is ceased, and the dispense valve 124 is closed and flow of coffee 126 to the cup 140 stops. This will signal the end of the dispensing cycle portion of the overall brew cycle. This is important since from the initial start of the brew cycle to the ceasing of the dispensing of coffee is a relatively short period of time. The apparatus and system of the present invention can prepare and dispense volumes of freshly brewed coffee from 8 ounces to 24 ounces within approximately 30 seconds using an appropriate charge and grind size of freshly ground coffee.

An upper piston assembly 250 has been briefly described hereinabove. The upper piston assembly 250 includes the upper piston 252 carried on a latch assembly 254. The upper piston 252 includes a central well 300 extending through an apparatus central axis 310 extending through the entire assembly 250. Also, a dispense passage 312 is formed in the upper piston 252 and coupled to the dispense line 122 exiting from the upper piston assembly 250. Brackets 314 are used to retain the piston on a housing 316 of the latch assembly 254 and gaskets 318 are provided to provide a seal between the upper piston 252 and inside surface 320 of the brew chamber 104.

The latch assembly 254 includes various components providing spring-biased movement of such components within the housing 316. The outwardly biased catches 322 include a beveled edge 324 which extend through apertures 326 of the housing 316. The latch assembly 254 allows for the engagement and disengagement of the frame 206 and movement of the upper piston assembly 250 being driven by the rotation of lead screw 270 in the latch assembly, as well as engagement and disengagement of the brew chamber assembly 220.

A drive collar 328 includes internally formed threads 330 for complementary engagement with the lead screw 270. This drive collar 328 is attached with fasteners 332 to the housing 316. A cover 334 is attached with fasteners 332 to close the latch assembly housing 316. FIG. 6-9 show various plan and elevational views as well as cross-sections of the upper piston assembly 250.

Figure 5:
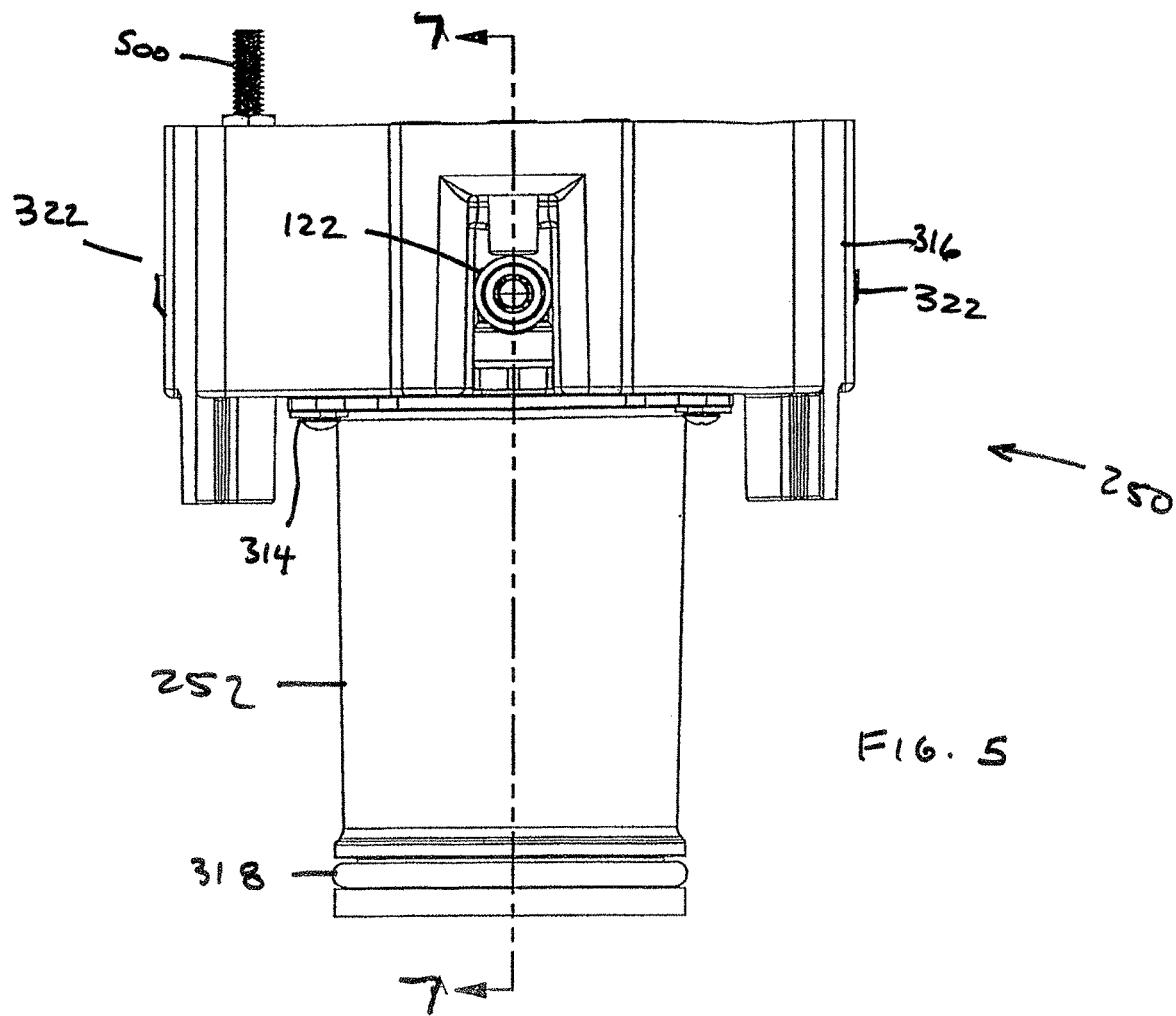
FIG. 5 is an elevational view of the upper piston assembly including the latch assembly.
Figure 7:
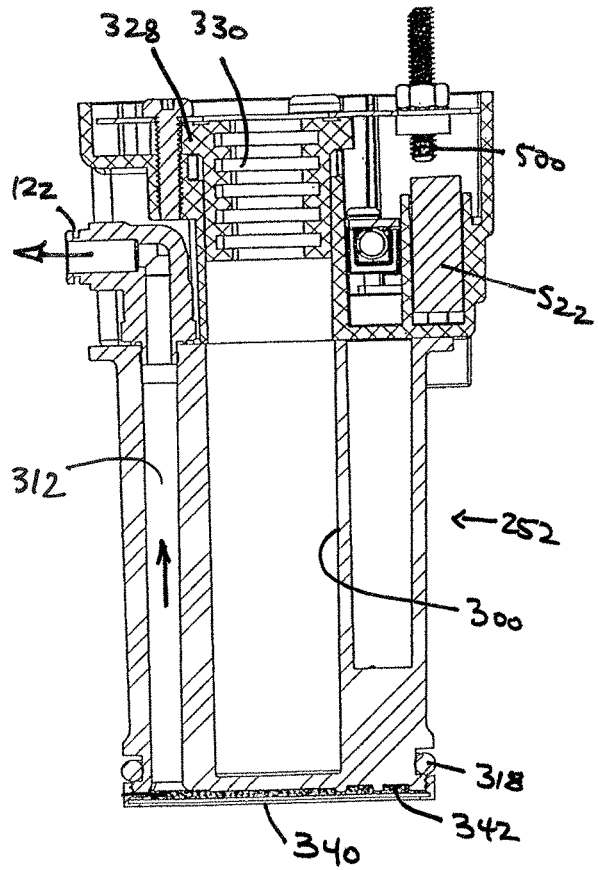
FIG. 7 is a cross-sectional view taken along line 7-7 in FIG. 5 showing the relative position of the upper piston retained on the latch assembly including a passage for dispensing brewed coffee from the assembly, a corresponding threaded structure for engagement with a lead screw driven by a drive motor, and spring biased catches and magnet assemblies used in the latching and unlatching of the lower piston assembly and swipe assembly.

FIG. 7 is a cross-sectional view through the upper piston assembly 250 taken along line 7-7 in FIG. 5. This cross-action shows a sieve 340 carried on the leading edge of the upper piston 252, which is spaced away from and forms a gap 342 with the leading face of the piston 252. This provides a path for brewed coffee to flow up through the dispense line 122 during the brewing process as described above. Also shown in this cross-action is the thread configuration 330 in the drive collar 328. The depth of the well 300 is illustrated and provides space for movement of the lead screw into and out of the piston 252. The use of the lead screw in the well facilitates covered operation of the lead screw that eliminates the accumulation of particles and other debris, which can found within the housing 198 of a beverage brewing machine 199 containing the brewing apparatus 200. Further, the position of the piston 252 relative to the coffee funnel 280 also shelters the lead screw and the other components from the flow of ground coffee into the brew chamber 104. By positioning the drive motor 264 in a location opposite the funnel and also sheltered by the other corresponding structures, the drive motor 264 is also shielded from the incidental accumulation of debris found in a coffee brewing machine.

The thoughtful layout and configuration of the components of the apparatus 200 helps to reduce the accumulation of debris on the various components by generally isolating these components from the sources of such debris. Further, the overall operation of the apparatus 200 further reduces ambient moisture levels. This is facilitated, in part, by the draining and ventilation of the dispense line 122 through the vent valve 115 as well as the evacuation step at the end of the brewing process to drain fluid from the dispense line 122. This helps assure that moisture from the brewing process is vented externally of the housing surrounding the apparatus 200 as well as through the chamber drain valve 108 to the corresponding drain 109. The reduction of moisture within the housing of the apparatus also helps reduce the ability for debris and other particles found in a beverage brewing apparatus housing from sticking to various surfaces within the apparatus.

The various components that have been described and identified within the specification are also shown in the additional illustrations of FIGS. 11-16.

Turning to the progressions shown in FIGS. 17-23, the operation of the various components in conjunction with the processes previously described is provided herein. With reference to FIG. 1, again to further describe the operation of the system, the valves and vents are retained in the condition as at the end of the dispense cycle but before returning to the home state ready to start the next brew cycle. However, now the upper piston can be moved slightly upwardly to create a degree of vacuum in the brew chamber 104 to draw residual fluid in the dispense line 122 back into the chamber. In this regard, the dispense valve 124 is maintained open for this brief evacuation step.

The dispense valve 124 is closed, and the other valves and vents are maintained in the closed position. However, at this point, the chamber drain valve 108 is operated to the open position and the upper piston is urged slightly downwardly to compress the coffee grounds in the bottom of the brew chamber 104. This compression of the grounds is intended to continue to drain the grounds, and any additional residual fluid that was pulled into the chamber during the vacuum step and exhaust this fluid through the drain. This helps to eliminate fluid from the ground coffee used in the prior brewing cycle and is necessary to evacuate the spent coffee from the brew chamber.

The chamber drain line valve 108 is maintained in the open position as lower piston is urged upwardly through the brew chamber to present the spent, drained puck of coffee from the prior brewing cycle for removal from the brewing chamber, as described in greater detail below. At this point, the vent valve 114 is returned to the normally open position to vent and facilitate further drying of the passages in the dispense line 122 and draining of liquid form and through the chamber drain valve 108, which is also in the open position.

With the context of the overall system in mind, we turn to further description of the various structures, operations of the structures and components and operation of the apparatus.

Figure 2:
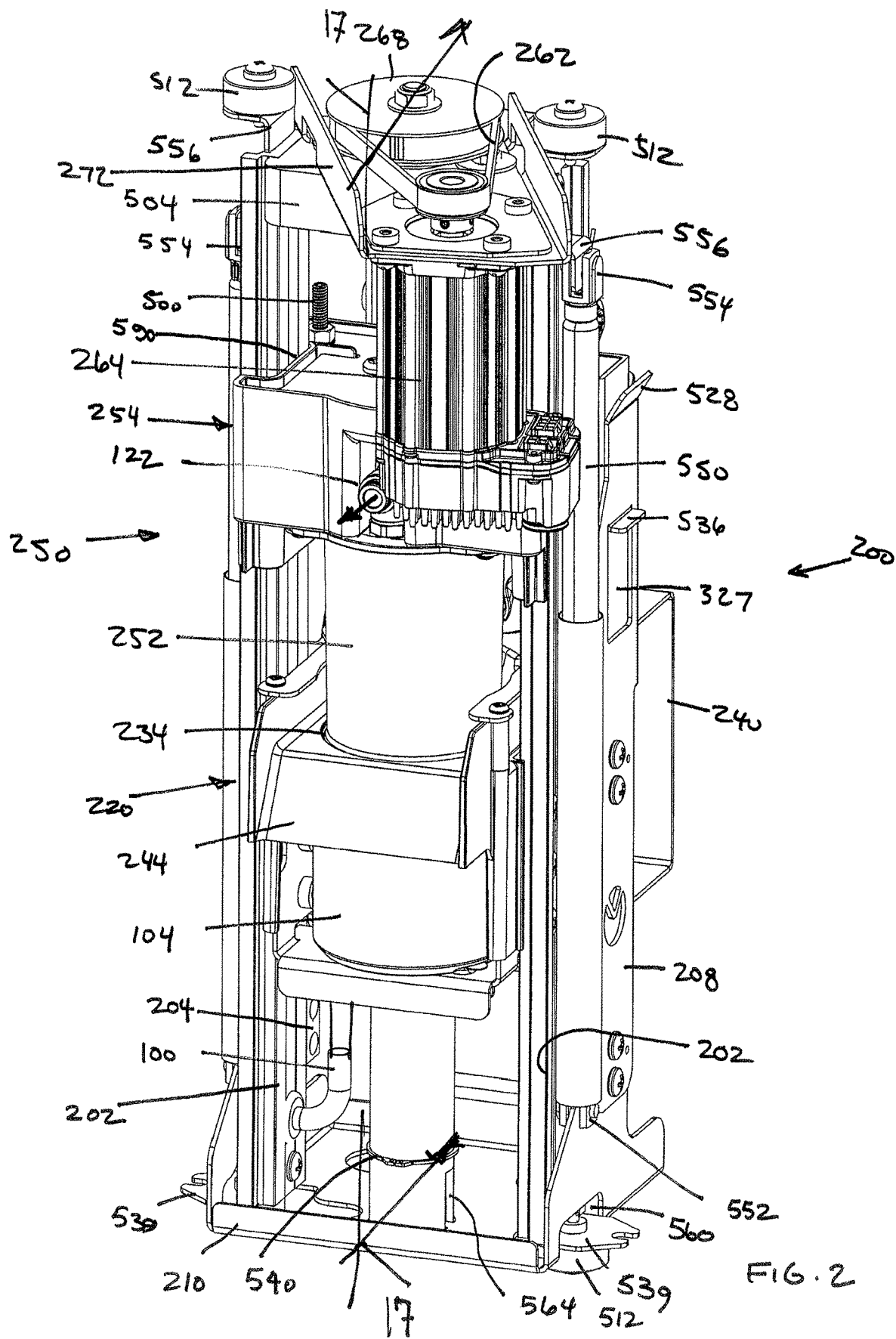
FIG. 2 is a perspective view of the apparatus of the invention including a frame, drive motor, upper piston assembly including a latch assembly, and a lower piston assembly including a brew chamber, all of which are cooperatively aligned along a central axis for operation to brew beverage in the with the brew chamber, and a wiper assembly for removal of spent coffee grounds from the apparatus.
Figure 3:
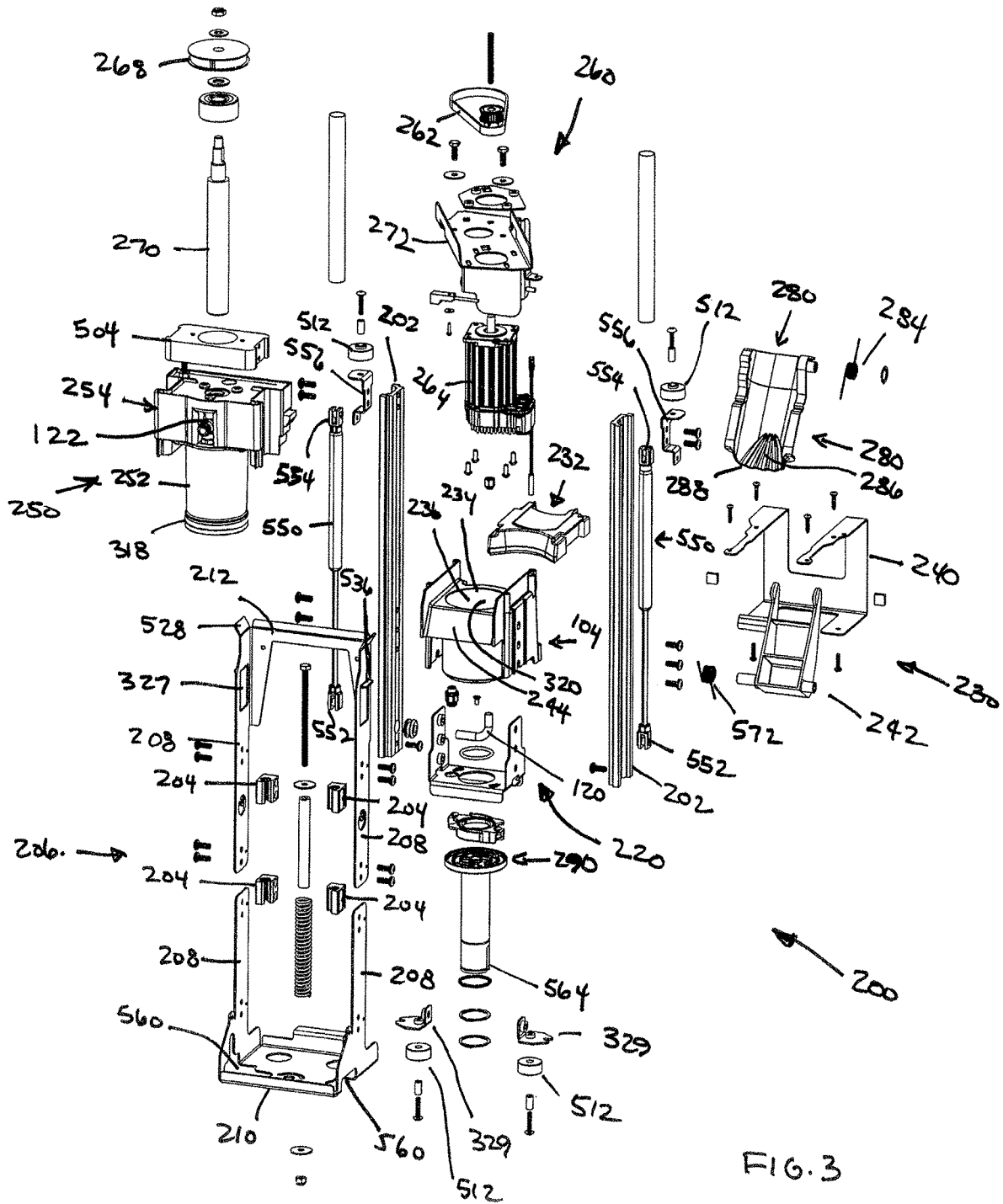
FIG. 3 is an exploded view of the assembly shown in FIG. 2 showing various assemblies, sub-assemblies, and components.
Figure 6:
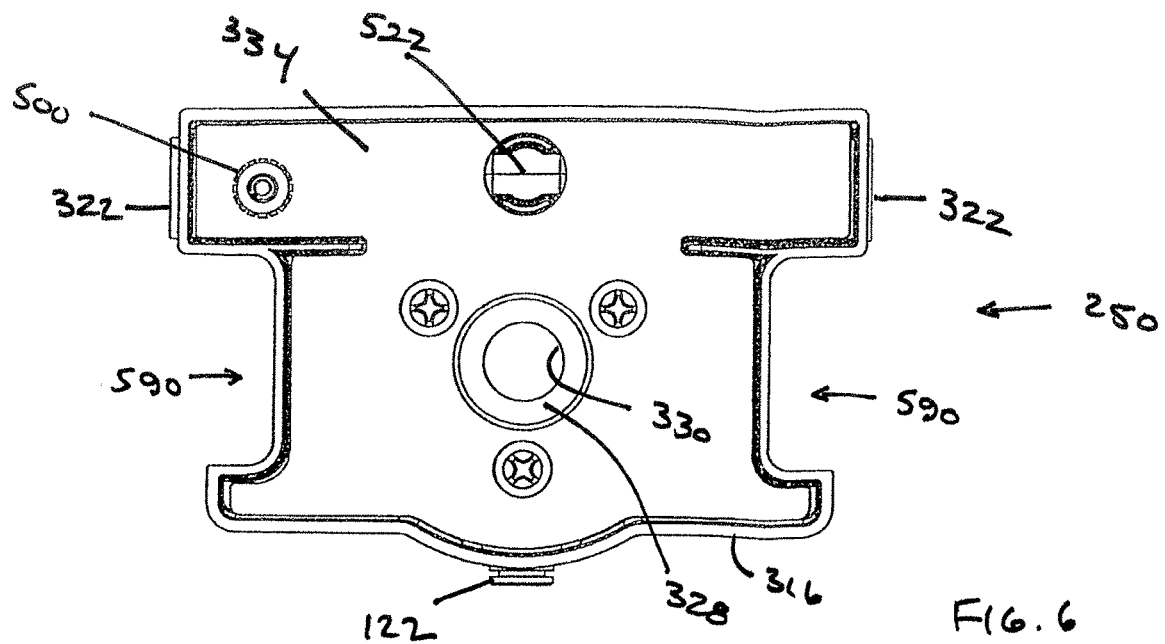
FIG. 6 is a top view of the upper piston assembly.

With reference to FIGS. 2 and 3, the overall apparatus, 200 is described. A pair of spaced apart generally vertical rails 202 are provided and provide a path through which various components travel in the operation of the apparatus 200. For example, guides 204 in the form of linear guide bearings are engageable with corresponding portions of the rail 202. These guides 204 are attached to and carried on a frame assembly 206. Frame assembly 206 includes side members 208, a base member 210, and an upper member 212. The frame structure 206 provides a movable frame that can linearly move upwardly and downwardly along the central axis 310 and the axially aligned spaced apart rails 202, 202. It should be noted that the rails 202 are mounted to a base (not shown) with brackets 329, and at the tops of each rail 202 by the spacer 504, to maintain the spaced apart dimension and stability during the operation of the assembly 200. Elastomeric cushions 512 are provided at top and bottom brackets 329 of the structure to help reduce vibration and noise transmission through the apparatus.

A brew chamber assembly 220 includes the brew chamber 104 the chamber water line 120. The brew chamber assembly 220 is moveably retained between and axially, vertically travels along the rails 202 for movement through the various steps of the brewing cycle. A lower piston 224 is carried within the chamber and maintained with a spring-biased configuration including the spring assembly 226.

An ejection or wiper assembly 230 is carried on the frame 206 and coupled to the brew chamber assembly 220 for operative movement of a slider 232 relative to the chamber mouth 234 defined as an upper rim of a cavity 236 of the brew chamber 104. As described in greater detail below, the ejector assembly 230 includes an ejector bracket 240, a spring biased ejection lever assembly 242 and the slider 232. At an appropriate stage during the brewing cycle, the slider 232 and spring-biased lever 242 operate to slide a puck of coffee presented at the mouth 234 of the brew chamber 104 off and down the beveled surface 244 at the edge of the brew chamber 104.

As shown in the upper portion of the exploded perspective view of FIG. 3, an upper piston assembly 250 including an upper piston 252 and a latch assembly 254 is provided. The latch assembly 254 is also slideably engaged along the rails 202 for linear movement upwardly and downwardly along a central axis 310. It should be noted that the entire assembly is configured along a single central axis 310 for movement and displacement of the various components along this axis. Primarily, the upper piston 252 and lower piston 224 move along the same axis. This is useful to prevent canting, binding or other issues associated with alignment or misalignment of the pistons in the brew chamber 104. This is in contrast to prior art assemblies that often times have a cantilevered piston extending from a side driven lead screw or column. Such prior art devices can cause problems since the off center engagement and disengagement of the pistons can become misaligned or cant over time. The single vertical axis alignment of the operative components of the present invention solves this problem and helps to facilitate more reliable operation with potentially less maintenance and repair.

A drive motor assembly 260 is coupled to the upper piston assembly 250 by means of a timing belt 262 coupled to a DC servo motor 264 with the other end of the belt coupled to a pulley 268 and a lead screw 270 operatively associated with the upper piston assembly 250. The motor 264 is attached to a bracket assembly 272, which is attached to the rails 202. The timing belt and pulley assemblies transfer energy from the motor 264 to lead screw 270 for rotation about the central axis 310.

A pivotable coffee funnel 280 is carried on an upper portion of the motor assembly bracket 272. The funnel 280 is pivotable about an axis 282 in a spring-biased manner using the biasing spring 284 to generally bias the funnel towards the piston to allow the funnel to deposit coffee from the grinders and directed through the funnel, through the mouth 234 of the brew chamber 104 and into the cavity 236 for mixing with water during the brewing cycle. The spring-biased structure of the funnel 280 allows the piston to pivot the funnel away from its path during a portion of the brewing cycle in which the piston is moved downwardly into the chamber.

The funnel 280 is provided with ridges 286 and a scalloped leading edge 288 to help distribute coffee dispensed through the funnel 280 throughout the cavity 236 of the brew chamber 104. This is in contrast to prior art systems that typically dispense coffee in a manner that results in a generally conical mound in the bottom of a brew chamber. This may not be preferable since, if the grounds are not spread out, an irregular coffee bed may result. An irregular coffee bed might be less than desirable since it might not produce uniform extraction of the coffee grounds. Nonuniform extraction of coffee from the grounds could result in over extraction of some grounds and under extraction of other grounds. As such, it would be desirable to provide a more uniform extraction of grounds to help optimize the use of the grounds, as well as provide more control of extraction of flavor characteristics to maintain a more predictable flavor profile. As such, the funnel design provided herein helps to provide a more uniform distribution of coffee grounds within the brew chamber 104 at the start of the brewing process.

The apparatus 200 of the present invention also helps improve the uniformity and distribution of the coffee bed by floating water upwardly from the bottom of the chamber at the initiation of the brewing cycle. Water could even be introduced into the chamber before ground coffee is added to the chamber further helping to spread the grounds on top of the water in the chamber. This helps to initially spread out the coffee grounds as they are dispensed into the chamber. Additionally, the sieve 290 provided on top of the lower piston is configured to provide a hole pattern which helps break up any nonuniform accumulation of coffee grounds in the bottom of the brew chamber 104. This helps attack the problem of nonuniform bed depth from both the initial distribution of the coffee grounds into the chamber, as well as the spreading of the grounds once they are in the chamber using the inlet water and the sieve pattern to help spread out the coffee grounds. The sieve pattern provides a configuration of different sized holes in a configuration that helps agitate the grounds with the inflow of a nonuniform distribution of water.

Figure 17:
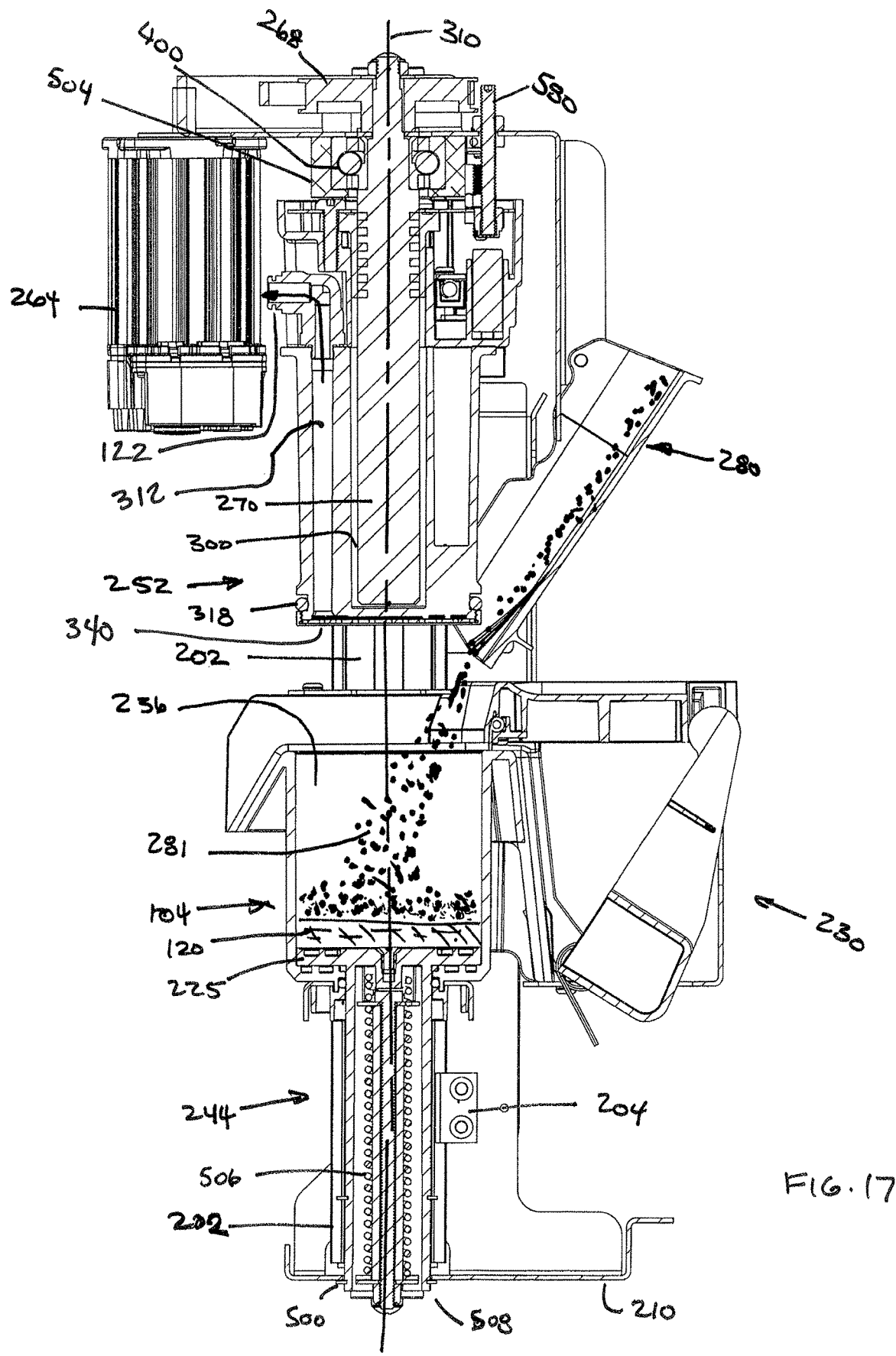
FIG. 17 is a cross sectional side elevational view taken along line 17-17 in FIG. 2, additional cross sectional views in this series of Figures are also taken along line 17-17 in FIG. 2 at various steps or progressions of the operation of the apparatus, the cross sectional view is taken through the central axis of the entire apparatus, in this cross sectional view of FIG. 17 the drive motor has operated the lead screw to drive the upper piston assembly upwardly along spaced apart and axially aligned rails facilitating positioning of a ground coffee funnel or chute for delivery of ground coffee into a cavity of the brew chamber within the chamber assembly, the brew chamber being positioned generally downwardly for use in the first stage of the brewing cycle, and in which is shown a representation of ground coffee deposited into the cavity of the chamber and the introduction of water into the chamber from a water fill line.

With reference to this FIG. 17, the apparatus is configured with the funnel 280 receiving ground coffee from the grinders and dispensing the ground coffee into the cavity 236 of the brew chamber 104. In addition, as noted, water 120 is introduced into the chamber generally at the same time or shortly before the ground coffee 281 is dispensed into the chamber. In this initial configuration the lead screw was rotated at the end of the previous brewing cycle to advance the piston 252 upwardly with the lead screw 270 extending into the well 300 of the upper piston 252. As noted herein, all of the other assemblies and components are shielded or sealed from stray particles of coffee, coffee fines, and/or coffee chaff. The dispensing of both these ingredients at the same time helps reduce the overall brew time.

After the dispensing of coffee has ceased the piston 252 is operated downwardly relative to the rails 202 by operation of the lead screw 270 along the central axis 310. It should be noted that the lead screw 270 is retained in a bearing assembly 400 attached to the cross member 504. The bearing assembly 400 provides smooth rotation of the lead screw 270 about the central axis 310 by operation of the controllable DC servomotor 264.

The piston 252 is moved downwardly into the cavity 236 of the brew chamber 104 in proportion to the coffee to be produced. In this regard, a larger production of brewed coffee requires more grounds and as such a larger chamber volume within the cavity 236 closed by the upper piston 252 can be provided. In the present invention, a recipe for brewing coffee programmed into the controller 44 includes not only the volume of water, the volume or other measurement of ground coffee (measured by grind time, weight, other measurement), but also the overall volume of the chamber cavity defined between the upper position face and the lower piston face in relation to these ingredients. As such, a recipe for a volume of coffee beverage to be produced needs to be calculated based on the final volume to be dispensed. This requires a backward calculation that adds in water in addition to the coffee beverage to be dispensed to account for some absorption by the ground coffee. In addition, some volume of coffee will be in the dispensed line 122 at the end of a brewing cycle and this volume will be drawn out of that line under vacuum and passed to the drain. As such, to produce 8 ounces of coffee might require 10 ounces of water with 2 ounces being the volume lost to absorption and draining. In addition, during the brewing process some additional volume of the sealed chamber is provided so that after the initial wetting and pre-infusion steps and additional water is added to the chamber the grounds can be somewhat agitated by this flow of water. This helps to thoroughly distribute the ground coffee in the slurry and optimize the extraction of the coffee components to meet a particular flavor profile. At the point of the process shown in FIG. 18, the vent valve 114 has been closed.

Figure 18:
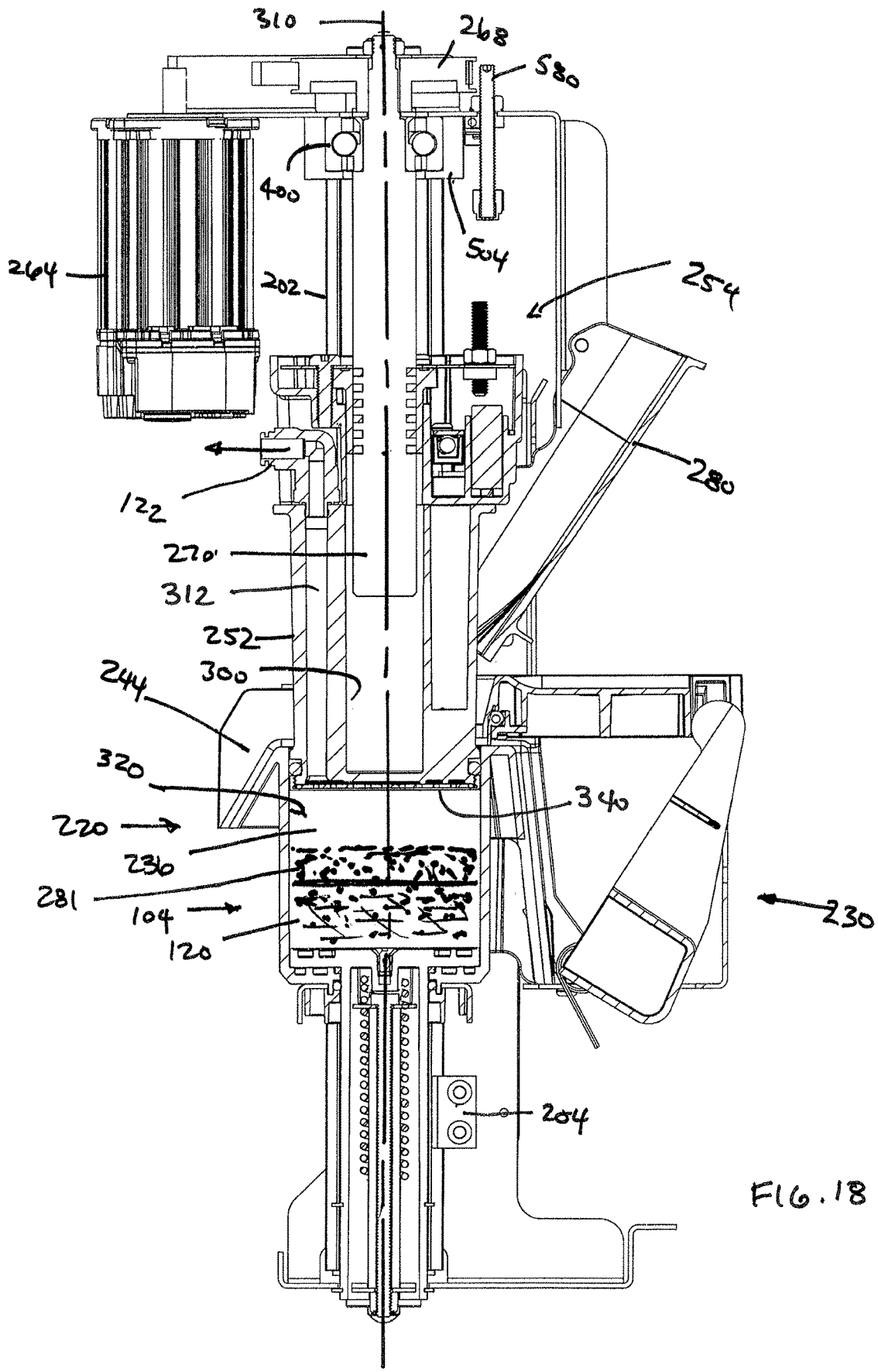
FIG. 18 is a cross sectional view similar to FIG. 17 but showing the continued downward driving of the piston assembly to engage the leading end of the upper piston in the mouth of the chamber defining the cavity with water introduced into the cavity for combination and/or mixing with the ground coffee also disposed within the cavity.

In the condition as shown in FIG. 18, the initial wetting of the coffee grounds has been accomplished and an additional pre-infusion shot of water has been added to the chamber. A predetermined dwell time is provided in the brewing process after which additional water is pumped into the cavity 236 of the brew chamber 104. Additional water being introduced into the chamber displaces the brewed coffee from the chamber upwardly through the dispense line 122 the water continues to be pumped into the brew chamber 104 until the predetermined volume of coffee has been prepared and dispensed from the chamber.

Figure 19:
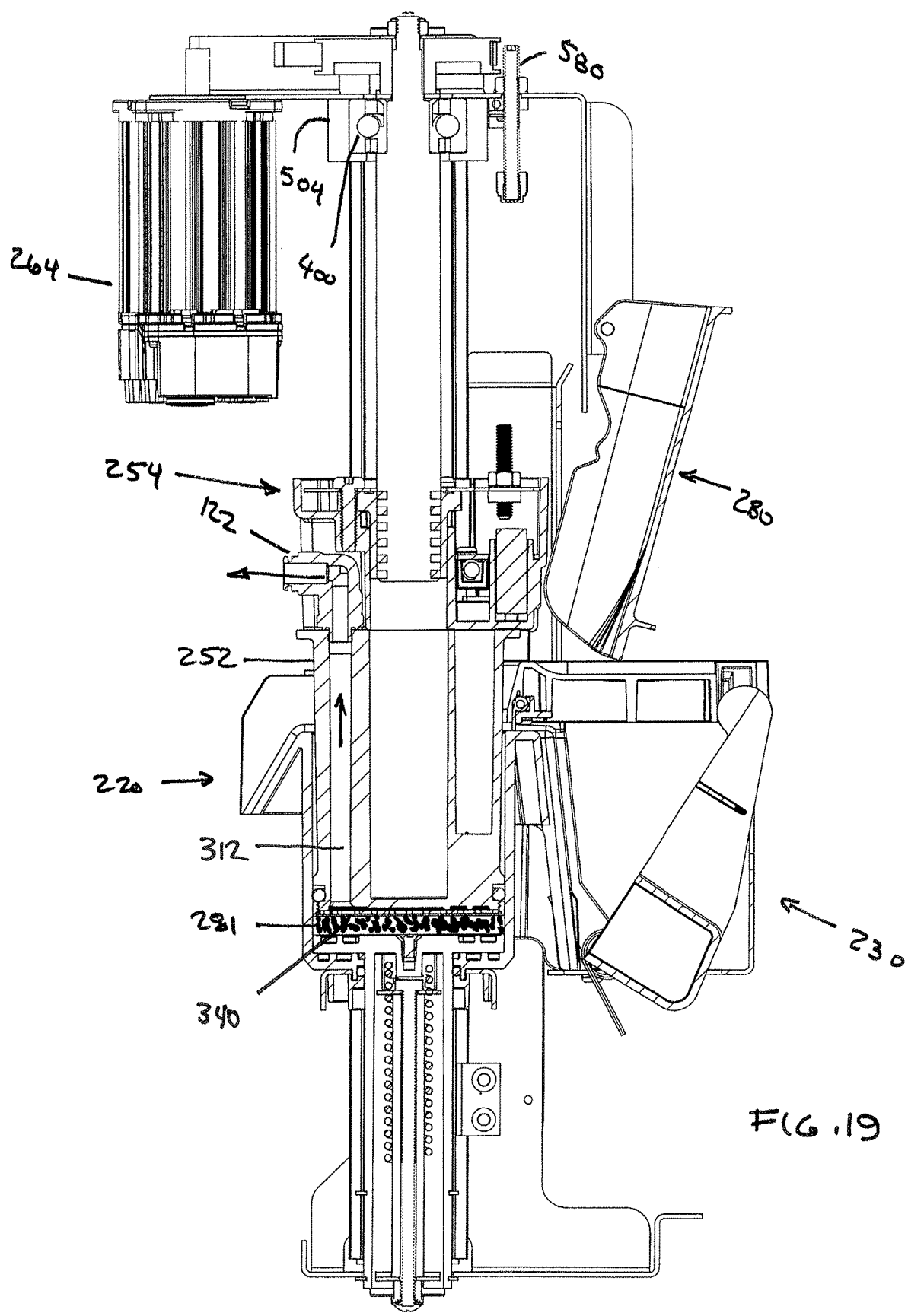
FIG. 19 is a cross sectional view similar to FIG. 17 but showing the upper piston being driven further downwardly by the lead screw towards the lower piston during which coffee brewed during prior phases of the brew cycle is continued to be driven out of the chamber through a dispense line and into a cup or container, this action compressing the ground coffee to a predetermined degree to help extract beverage from the grounds for delivery to the cup, also downward movement of the upper piston assembly displaceably moves the ground coffee funnel out of the way and also downwardly displaces the spring biased lower piston assembly and engages the frame with retractable latching mechanisms extending from the upper piston assembly for upward movement and displacement of both assemblies in a subsequent step of the process.

In the next step is shown in FIG. 19, the piston is driven further downwardly by the lead screw to the maximum extent possible. The lead screw is controllably operated depending on the method used until it stops. The leading edge of the piston compacts against the coffee in the chamber as detected by the torque feedback on the motor. The grounds are squeezed but not too much so as to not introduce overly extracted components of the coffee, perhaps bitter components as well as additional fines.

Figure 20:
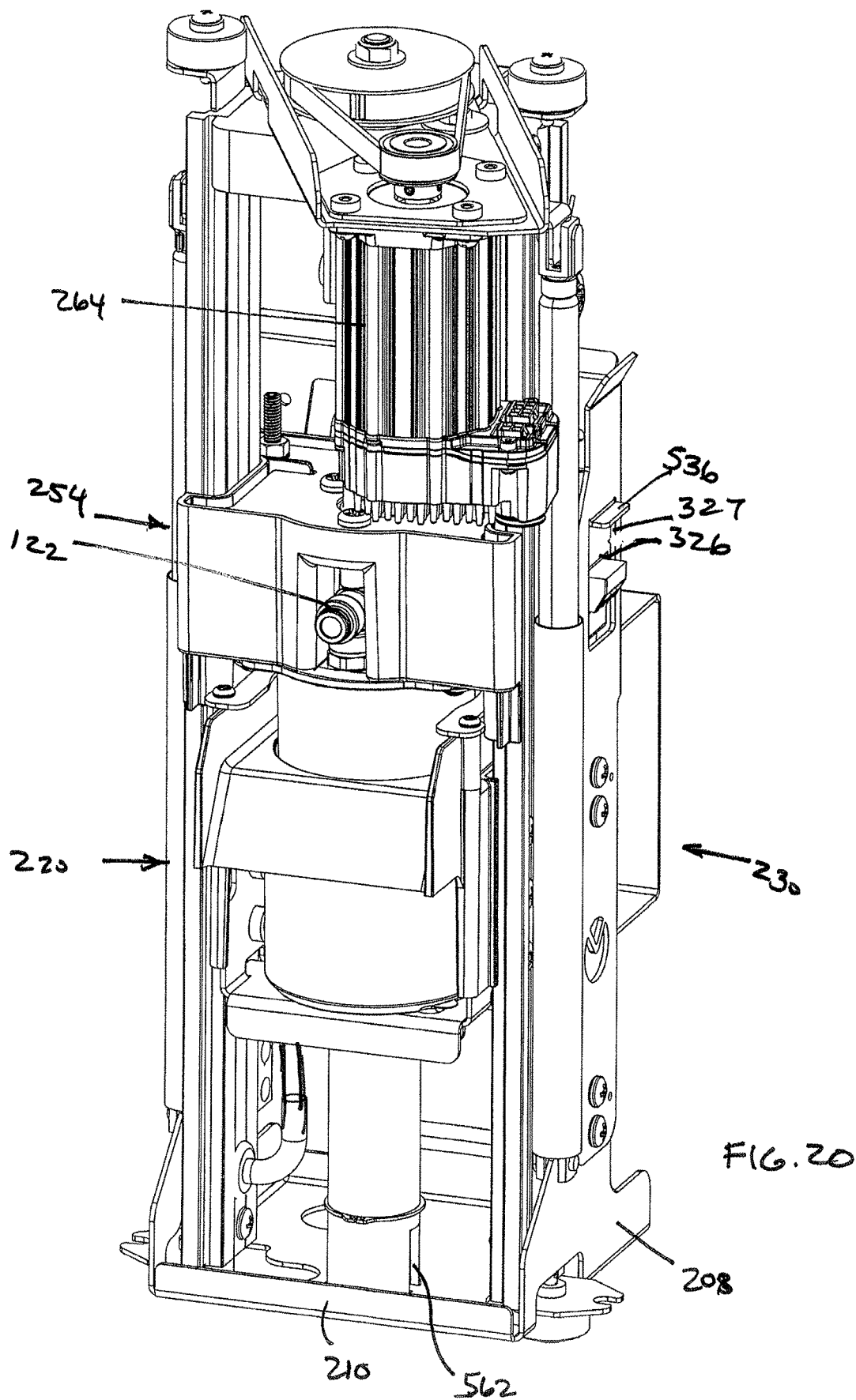
FIG. 20 shows the assembly progression as shown in FIG. 19 in which the catches extend outwardly to engage corresponding apertures in the frame thereby releasably engaging the lower piston assembly with the upper piston assembly, the latch mechanisms extending outwardly through the aperture but facilitating a degree of travel to allow movement of the upper piston relative to the lower piston assembly during which the upper piston assembly is displaced upwardly away from the lower piston assembly to create a vacuum on the dispense line drawing undispensed coffee back into the chamber for drainage through a drain line.
Figure 21:
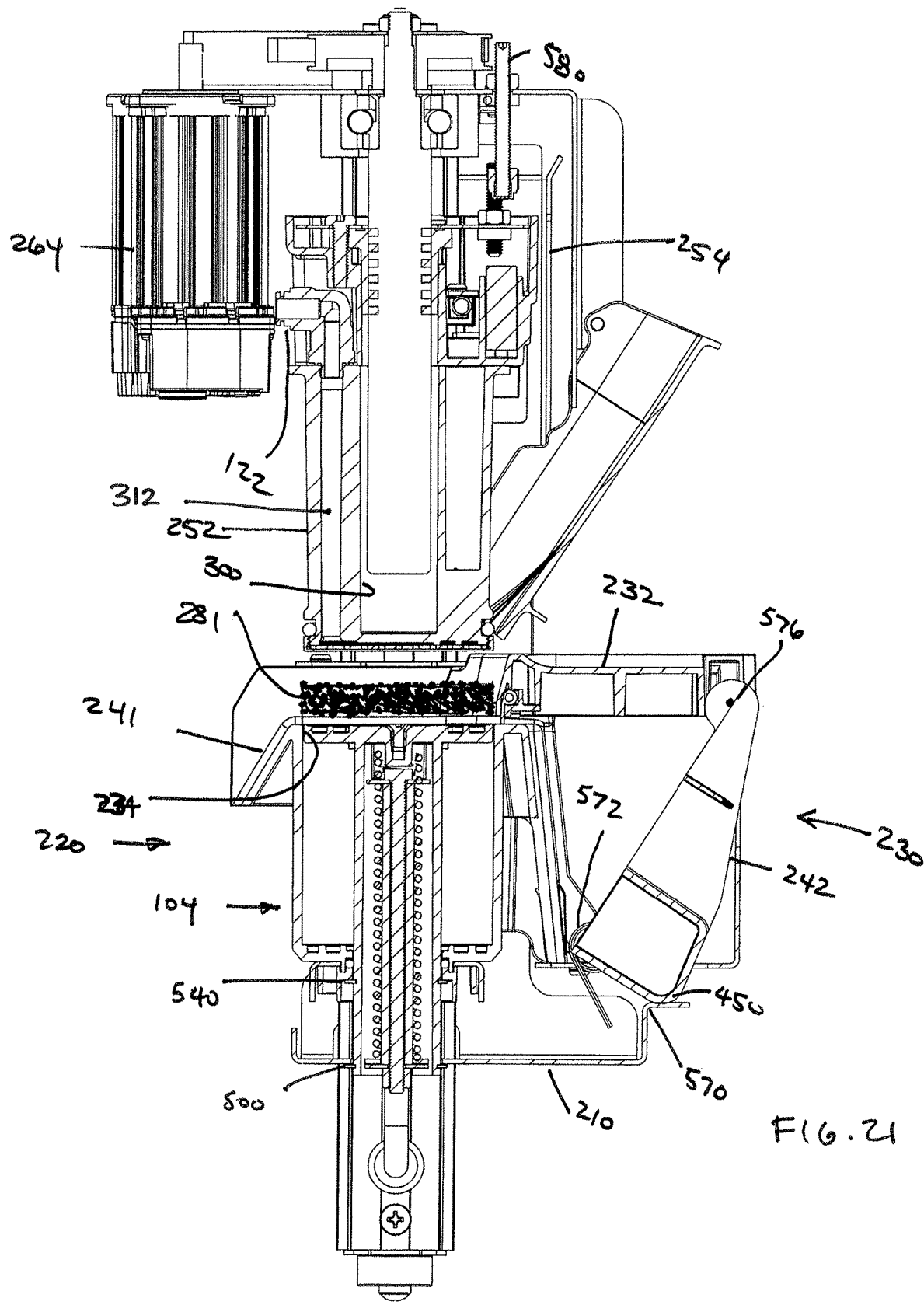
FIG. 21 shows the upper piston moved into the upper position and presentation of the lower piston to upwardly displace a puck of drained spent coffee for presentation and removal from the chamber at a level aligned with a flexible blade of the wiper assembly.
Figure 22:
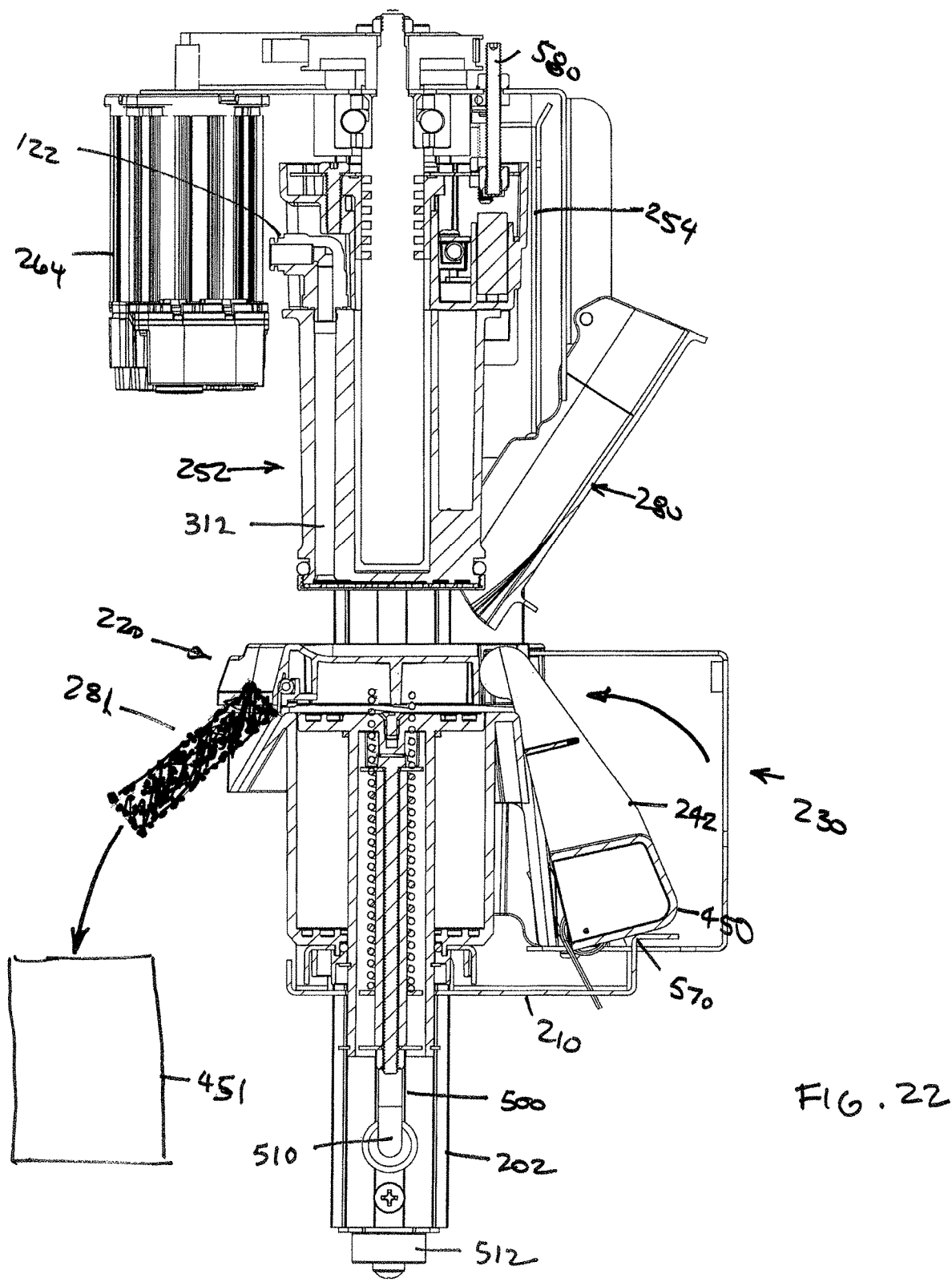
FIG. 22 shows movement of the swipe mechanism to eject the spent puck of coffee from the assembly and positioning of the upper piston and coffee funnel for the next brew cycle.

In the next step, generally shown in FIG. 20, the piston is operated upwardly along the central axis slightly to create somewhat of a vacuum within the chamber. This results in drawing any fluid retained in the dispense line after the end of the dispensing cycle to be drawn back into the chamber. During a secondary squeeze the piston is driven down an additional cycle with the drain now opened to allow forcing residual liquid out of the ground coffee and down the drain line. In this condition, the vent valve is also opened to ambient. After this additional draining squeeze of the grounds the lead screw operates the piston upwardly. However, once a piston has bottomed in the chamber the latching mechanism 254 becomes activated with the catches extending outwardly through the apertures. This engages the frame on the latching assembly 254 that draws the chamber upwardly with the movement of the upper piston driven by the lead screw. This upward movement draws the base 210 and side frame components 208 upwardly compressing the spring in the lower piston and driving the lower piston upwardly (see FIG. 21). Driving of the base upwardly, as shown in FIG. 21 drives against the ejector lever 242. Engagement of the bottom 210 against the elbow 450 of the ejector lever 242 causes pivoting of the lever 242 and driving of the wiper 232 across the face of the brew chamber 104. In this condition, the lower piston has driven the spent puck of coffee upwardly and it is aligned with the upper edge of the mouth 234 and can be ejected by the wiper as the lever operates the wiper forward and horizontally across the face of the chamber. As shown in FIG. 22 the puck of coffee slides down the beveled surface 244 into a collections bin 451 there below.

In use, the brewing method and steps as described above can be accomplished using the apparatus 200 of the present invention. Starting with FIG. 17, the piston 252 carried on the latch assembly 254 is driven upward on the lead screw 270 by the motor 264. This is the start position or home position in preparation of the start of a brew cycle. This is also the position that results at the end of the prior brew cycle so as to have the brew chamber 104 ready for the next brew cycle. This home position is determined by calibrating or adjusting a stop sensor assembly including the adjustable home sensor probe 500 and corresponding proximity sensor 502 coupled to the controller 44. The proximity sensor 502 is carried on the upper spacer 504 connected to the top of each rail 202, 202.

In the configuration as shown in FIG. 17 the spring 506 associated with the lower piston 224 is fully extended with a top 225 of the piston 224 bottoming out in the bottom of the brew chamber 104 and the spaced apart end 508 retained by ring 510 at the bottom 210 of the frame.

As shown in FIG. 18, the upper piston assembly 250 has been driven downwardly by the motor 264 operating the lead screw 270 along the central axis 310. With reference to FIG. 19, continued downward movement of the upper piston 252 on the rails 202 further compresses any material in the chamber during the brewing process.

Figure 10:
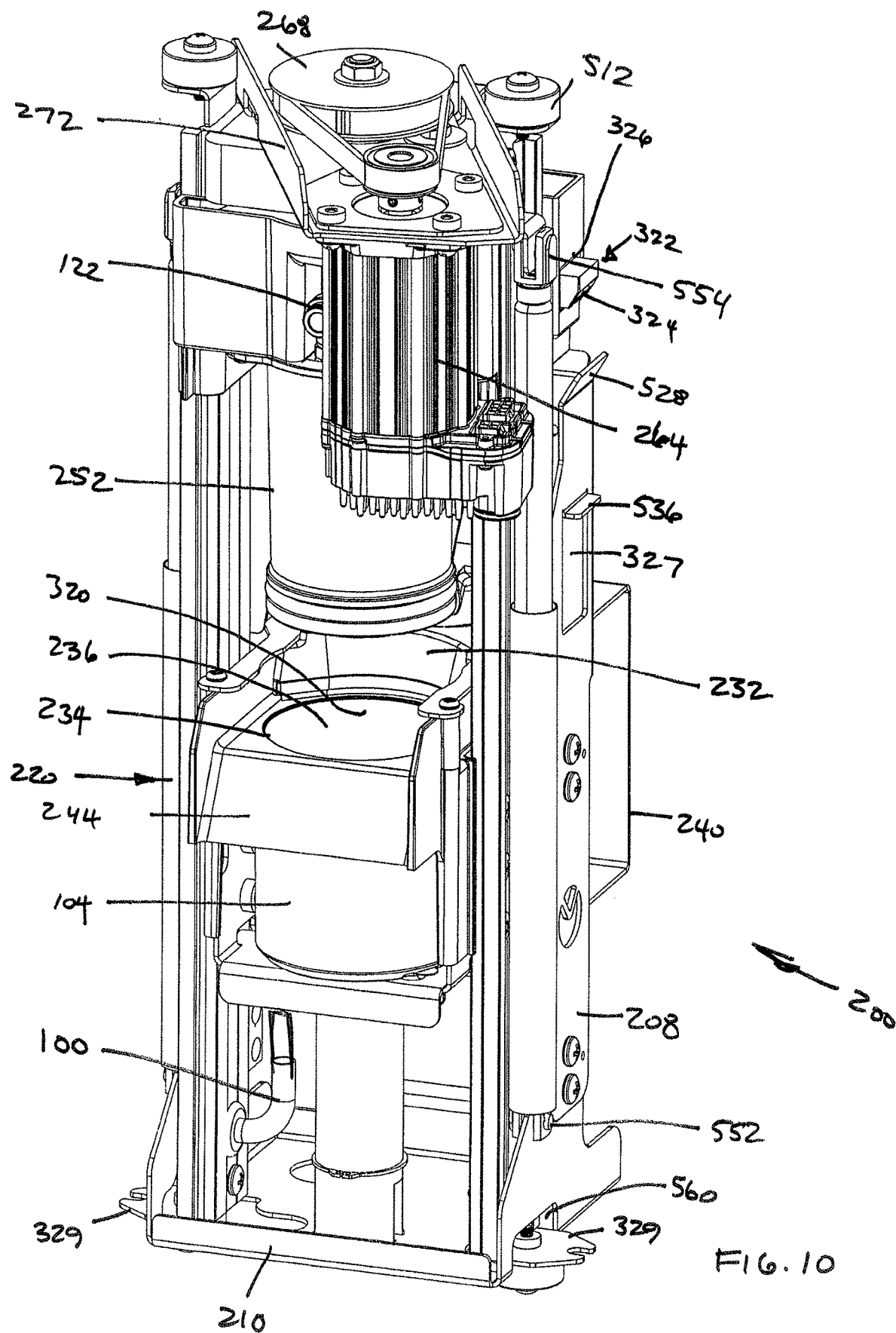
FIG. 10 is a perspective view similar to that as shown in FIG. 2 in which the upper piston assembly has been driven upwardly by the drive motor to an upper most home position for the start of a brew cycle.
Figure 11:
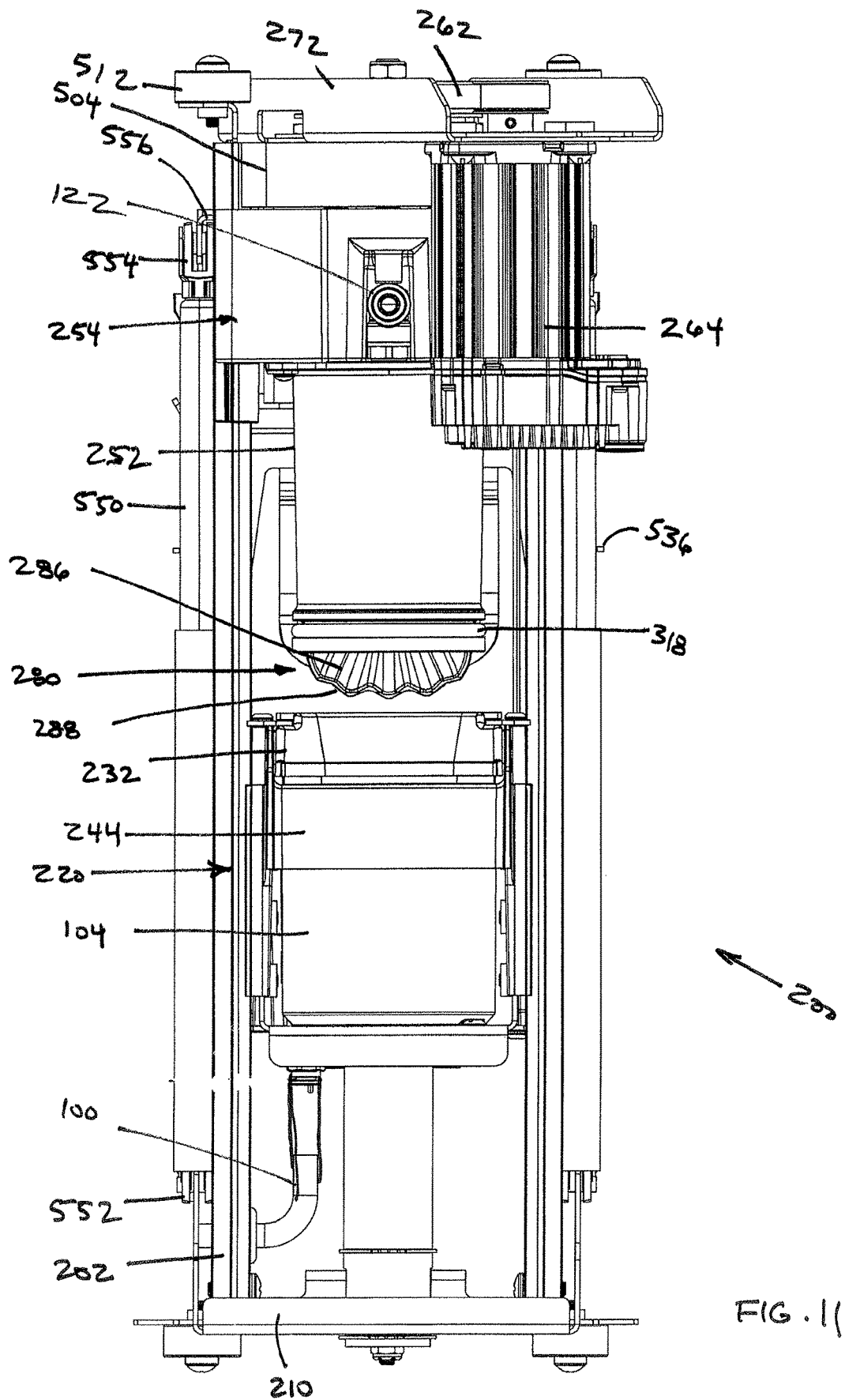
FIG. 11 is a front elevational view of the apparatus in FIG. 2.
Figure 12:
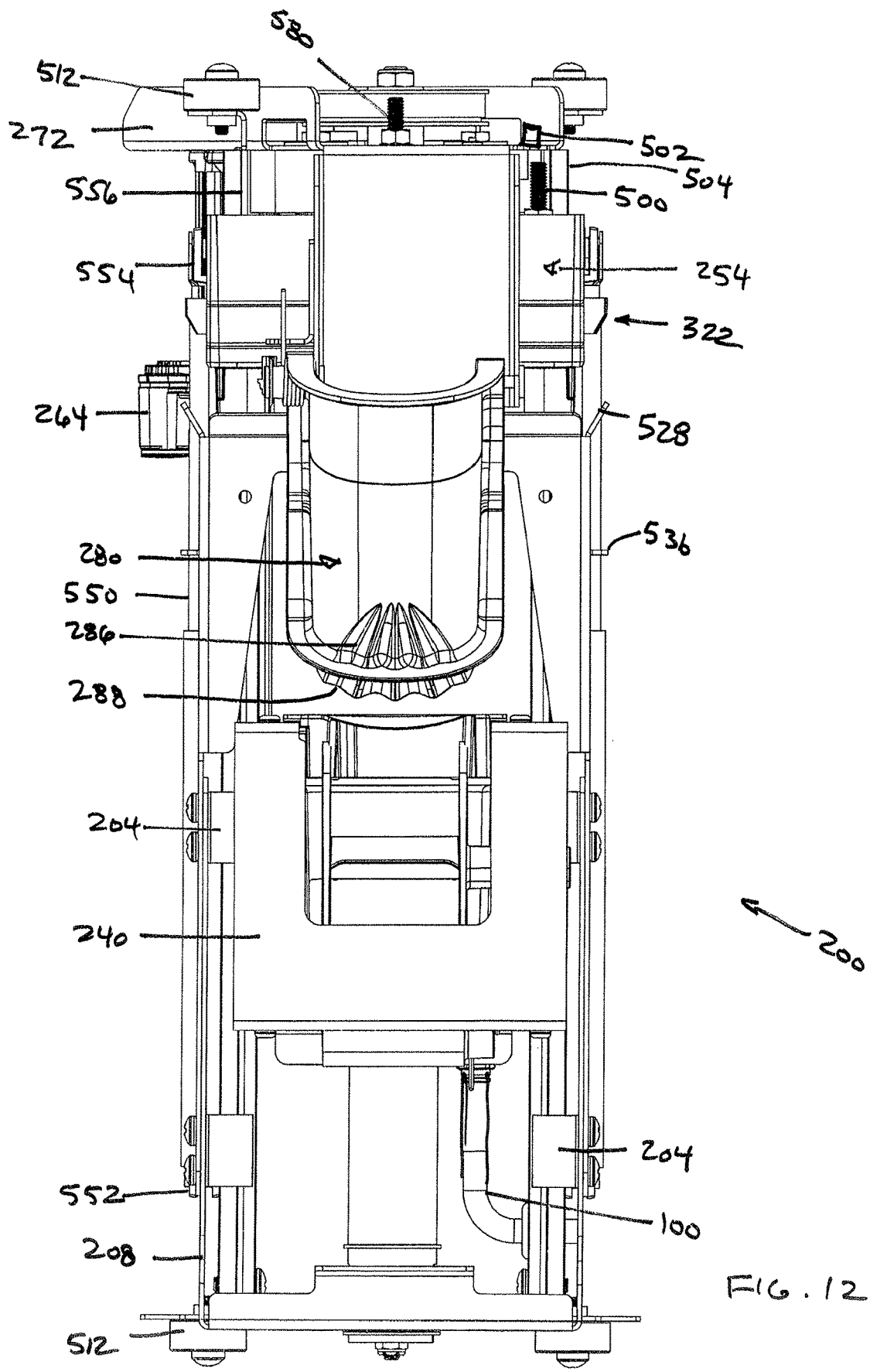
FIG. 12 is a rear elevational view of the apparatus in FIG. 2.
Figure 13:
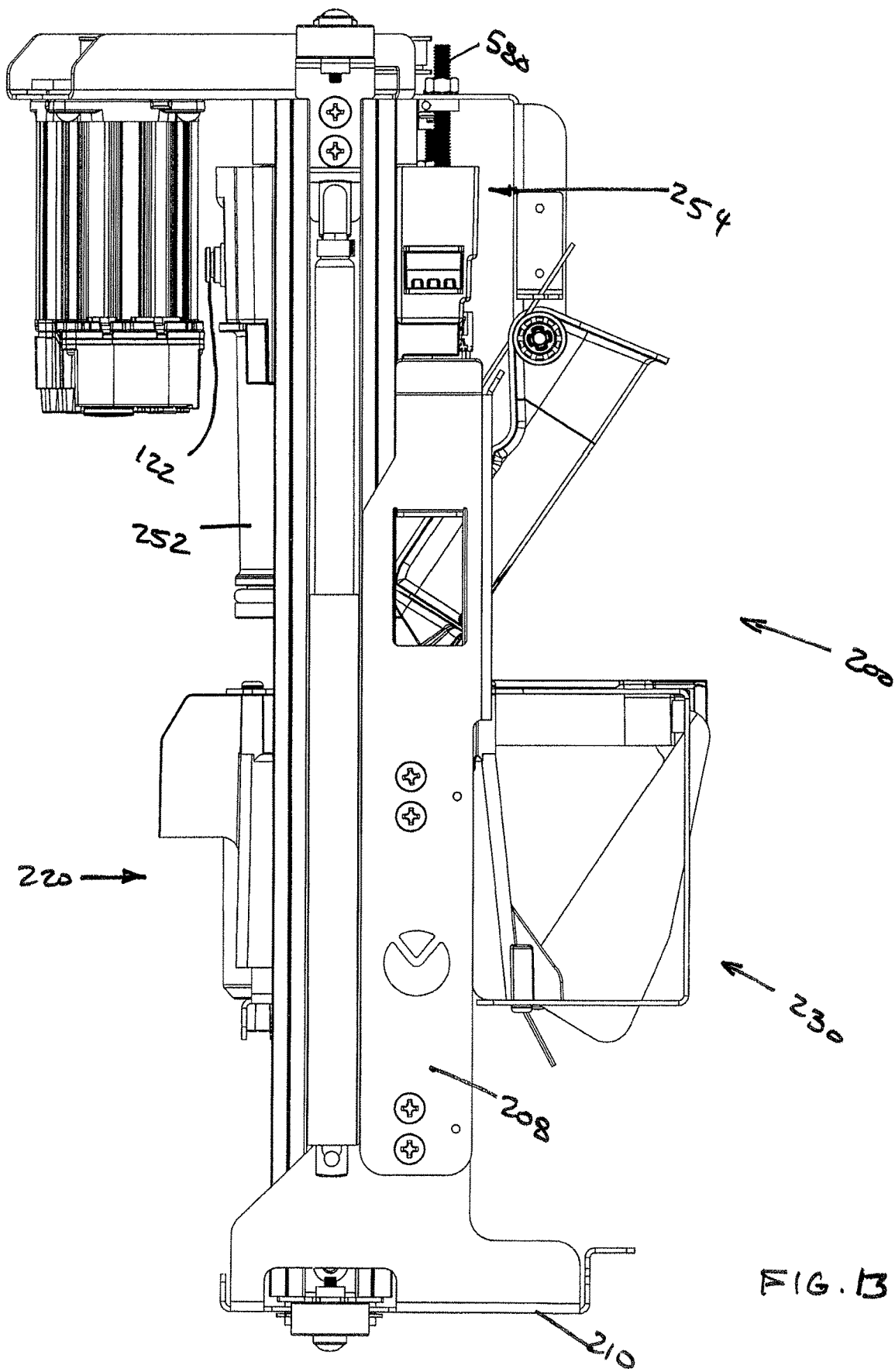
FIG. 13 is a left side elevational view of the apparatus in FIG. 2.
Figure 14:
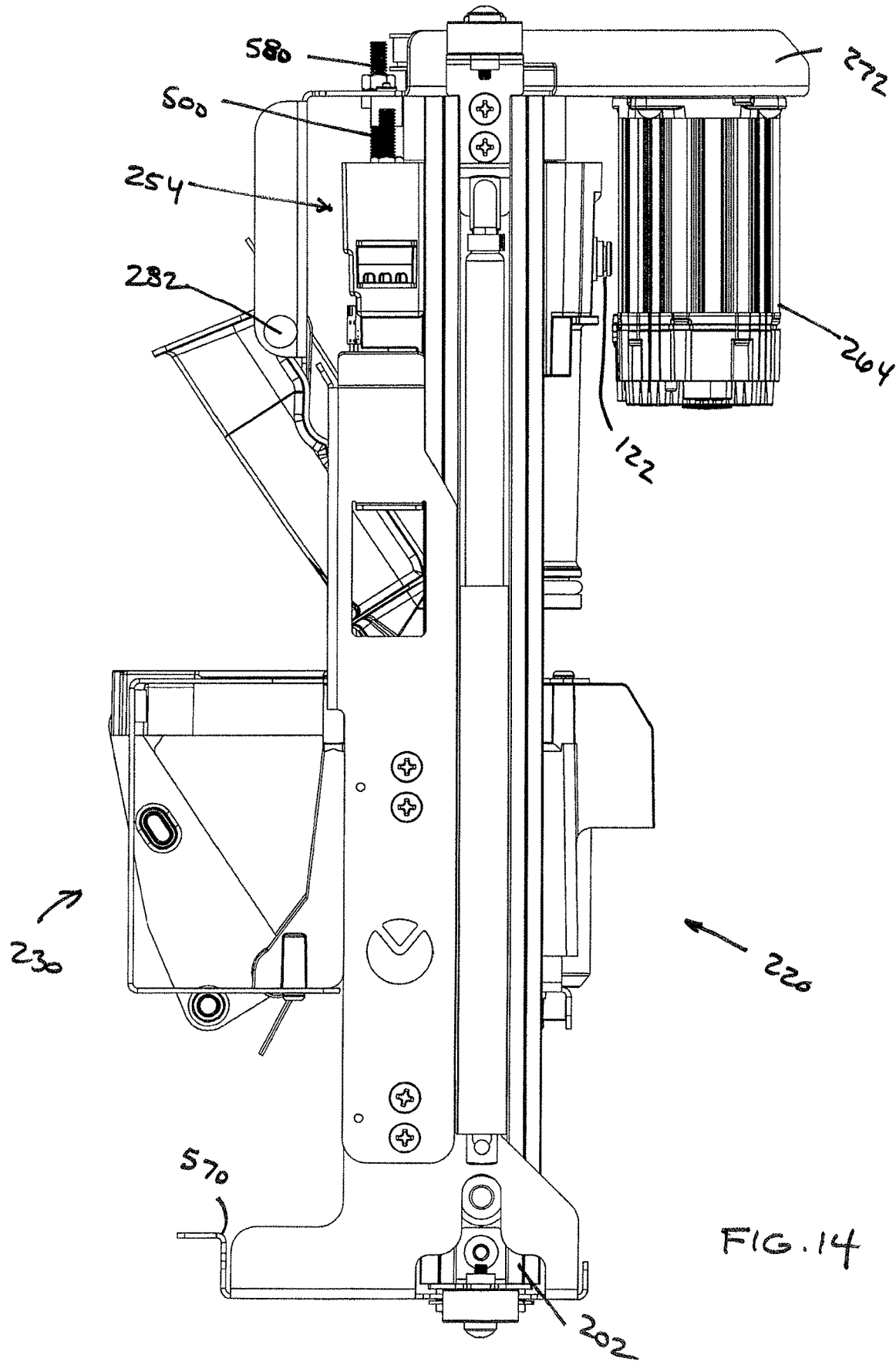
FIG. 14 is a right side elevational view of the apparatus in FIG. 2.
Figure 15:
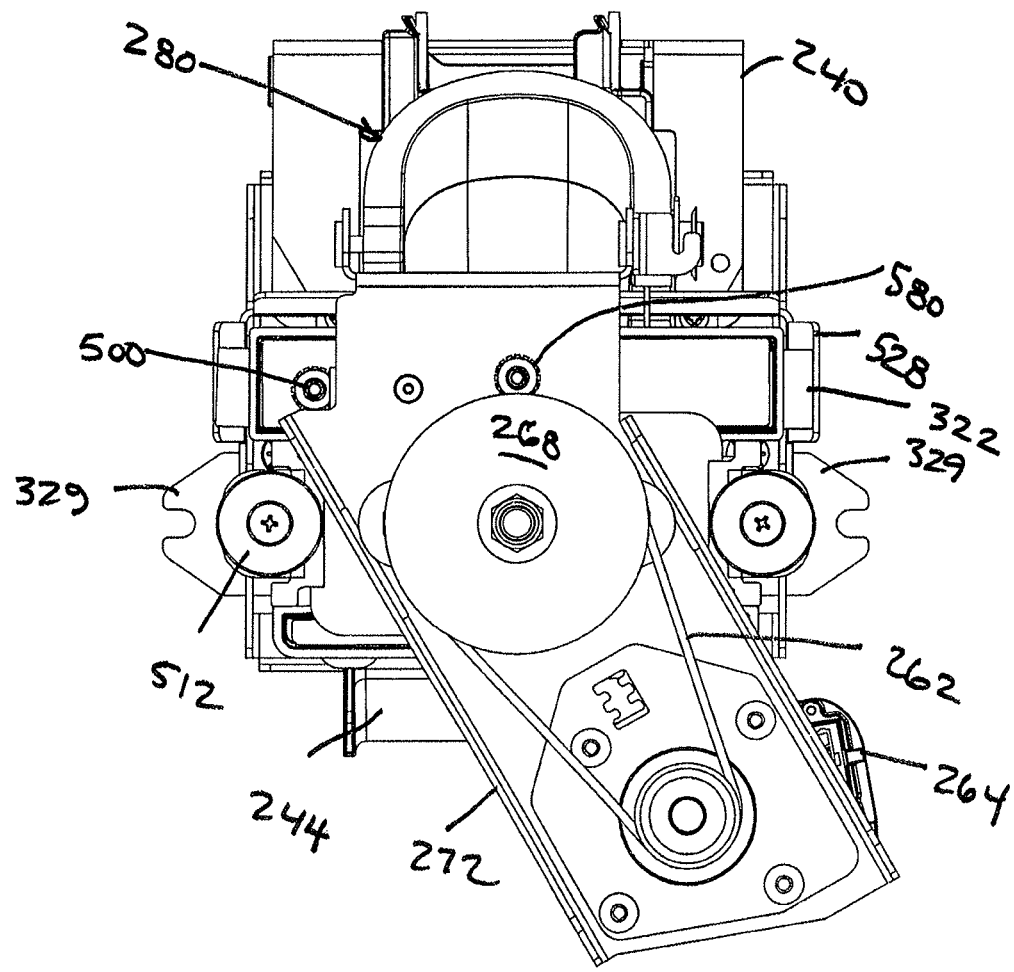
FIG. 15 is a top plan view of the apparatus in FIG. 2.
Figure 16:
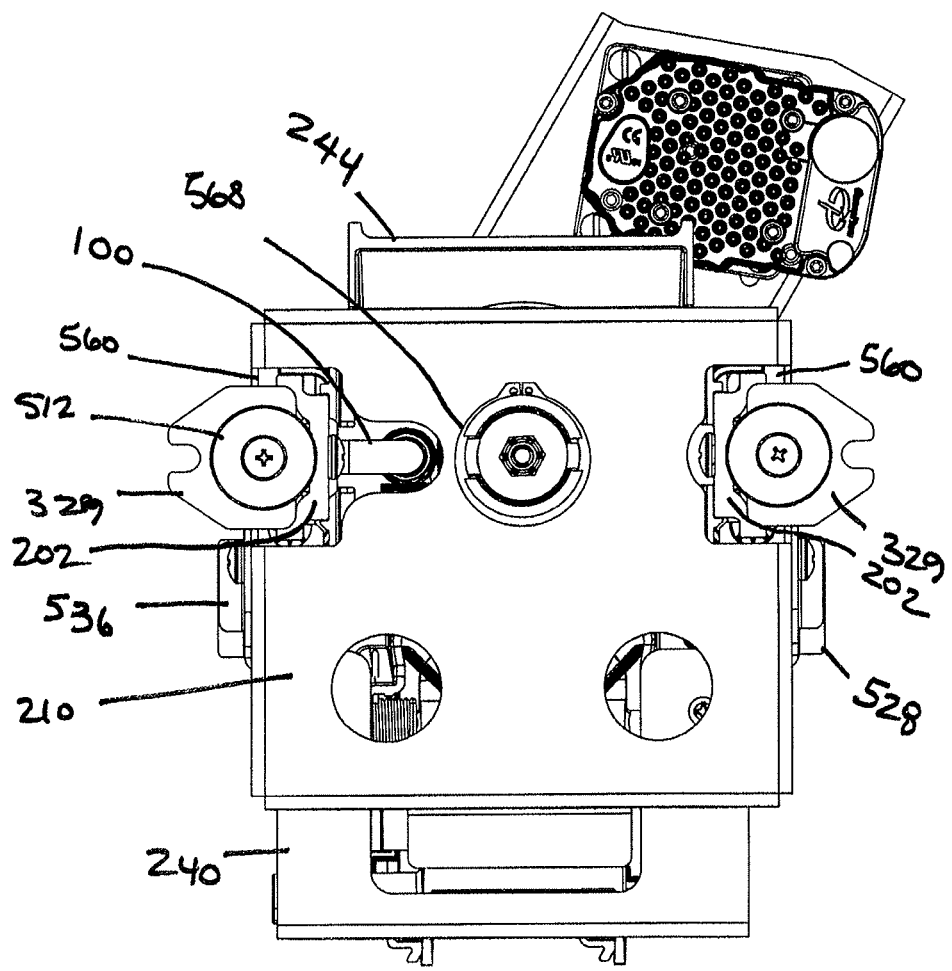
FIG. 16 is a bottom plan view of the apparatus in FIG. 2.

In the upper most position as shown in FIG. 17 the catch portion 322 on both sides of the latch assembly 254 extend from the latch assembly as shown in FIG. 10 under the influence of the biasing spring 520 urging the catches 322 outwardly from a release structure. These catches 322, spring 520, and release component 522 are assembled and retained in the housing 316. Flanges 524 on both sides of the release component 522 engage on the inside of corresponding slots 526 of each catch 322 to couple the release structure to the catches. As assembled and as in the normal state, the catches 324 are biased to extend through the apertures 326 of the latch assembly housing 316. This is generally the state that is maintained until something causes the catches 324 to be drawn inwardly against the spring 524 force. When the catches are inwardly compressed by engagement against another structure such as a side portion 528 of the frame 206 the release component 522 is moved downwardly due to the engagement of flanges 524 and slots 526. The portion 528 of the frame has an upper end with an outward bevel 530 facilitates progressive movement along the bevel 524 of the catch 322 to reduce forces and prevent the structures from hanging up during the movement.

As the latch assembly 554 is further moved downwardly, the catches 522 encounter an aperture 534 in the frame 206. Due to the outward spring biased arrangement of these structures, the catches 322 extend outwardly through the aperture 534. The apertures 534 include a corresponding extension 536 that provides a plate against which the upper portion of the catch abuts (see FIG. 23). Engagement of the catches 322 in the aperture 534 results in releasably capturing the frame 206, which allows the frame and components, attached thereto such as the brew chamber assembly 220 to rise with the upper piston assembly 250 as it travels along the central axis 310 driven by the lead screw 270.

As the captured assembly travels upward, gas springs 550, normally extended and uncompressed, is compressed. A bottom end 552 of each gas spring 550 is attached to an area on the bottom portion 210 of the frame. An upper portion 554 of each gas spring is attached to a bracket 556 attached to an upper portion of each, corresponding rail 202. Once the frame 206 is released from its latched engagement with the upper piston assembly, the gas springs 550 act to urge the frame downwardly to the home position. The gas springs also help to dampen the movement of the frame downwardly so as to prevent sudden motion which could have unnecessary wear and tear on the components as well as contribute additional vibration and noise in the operation of the apparatus.

As previously noted, a lower end 508 of the bottom piston 224 extends through the bottom portion 210 of the frame. As the frame 206 is drawn upwardly as described above, the lower piston 244 will be driven upwardly in the brew chamber 104 to a position as shown in FIG. 21. This helps to elevate the drained puck of spent coffee to the top rim or mouth 234 of the brew chamber 104. In this upper position, the lower piston 244 is prevented from further upward travel by a lock ring 540. The lock ring dead stops against an outside bottom portion of the brew chamber 104. However, as noted above, the lower end 508 of the piston 244 also has another lock ring 500.

The chamber assembly 220 travels axially along the central axes 310 between the spaced apart rails 202. The frame 206 generally travels along the outside of the rails 202 and rearwardly of the front of the rails as shown in FIGS. 2, 13, 14, 15, 20 and 23. The bottom portion 210 has openings 560 that allow relative passage of the frame 206 over the rails extending through the bottom portion 210 as the frame 206 is urged upwardly or downwardly along the central axis 310. Movement of the chamber assembly 220 is limited by opposed slots 562 on the lower end 564 of the lower piston 244. The slots engage a correspondingly configured aperture 568 in the bottom portion 210.

In the progression from FIG. 21 to FIG. 22, the wiper assembly 230 is actuated to shift the wiper 232 from the position shown in FIG. 21 to the position as shown in FIG. 22. This action or generally horizontal movement of the wiper 232 is what drives the puck of spent coffee off of the top portion of the lower piston and into a collection bin 451 outside of the brewing assembly.

The operation of this wiper assembly 230 is the result of movement of the ejector lever 242 by engagement with a camming portion 570 on the lower portion 210. As shown in FIG. 21, the ejection lever 242 is spring biased outwardly away from the brew chamber 104 by a biasing spring 572. As the camming structure 570 engages the elbow 450 of the lever 242, it drives the lever about the pivot point 574 rotating the lever (as shown in FIGS. 21 and 22) counter-clockwise. A rotational point 576 of the lever 242 is engaged with the wiper component 232. The wiper is retained in a horizontal position for relative horizontal movement across the top of the brew chamber 104 and therefore the motion of the lever 242 is translated to horizontal driving motion of the wiper 232.

As a latch assembly 254 is driven upwardly on the lead screw 270, the release component 522 contacts the adjustable release rod 580. The release rod 580 is adjustable so that the release action on the release component 522 and the corresponding spring biased catches 322 can be calibrated to disengage the catches 322 from the corresponding aperture 534 and plate 536. Once the aperture catches 322 are released from the corresponding aperture 534, the frame 206 is released from the latch assembly 254. Since the gas springs had been compressed by the previous upward motion, they act to urge the disengaged frame 206 downwardly. Disengagement of the frame, and downward movement of the frame 206 draws the chamber assembly 222 along with it since the lower portion the piston is captured by the ring 500 on the outside of the lower portion 210 of the frame 206. Downward motion of the frame 206 and chamber assembly 220 disengaged the cam 570 from the lever 242 whereby the biasing spring 570 to causes the lever to rotate clockwise about the pivot point 574. This motion draws the wiper 232 horizontally away from the mouth 234 of the brew chamber 104 clearing the mouth 234 to receive coffee in the next brewing cycle.

The latch assembly 254 as shown in FIGS. 5-9, illustrates the recessed areas 590 on opposed sides of the housing 316 which the line the assembly 254 between opposed faces of the rails 202. In other words, the faces of each rail 202 are positioned within the recesses 590. While the assembly 254 is urged upwardly and downwardly by operation of the motor 264 on the lead screw 270 engaged with the drive component 238 in the housing, the configuration of the recessed areas 590 and rails 202 helps maintain alignment and axial travel of the assembly 254 along the central axis 310.

Figure 8:
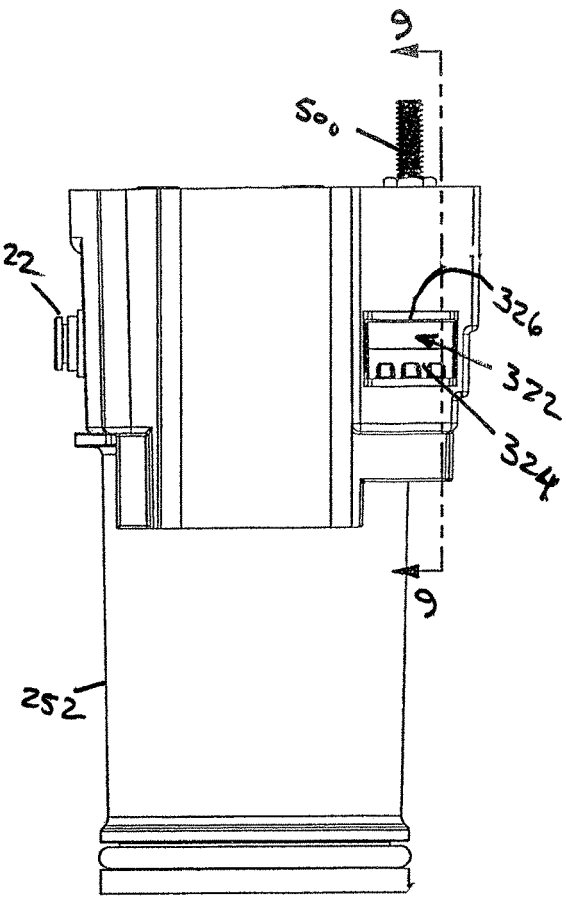
FIG. 8 is a side elevational view of the upper piston assembly.
Figure 9:
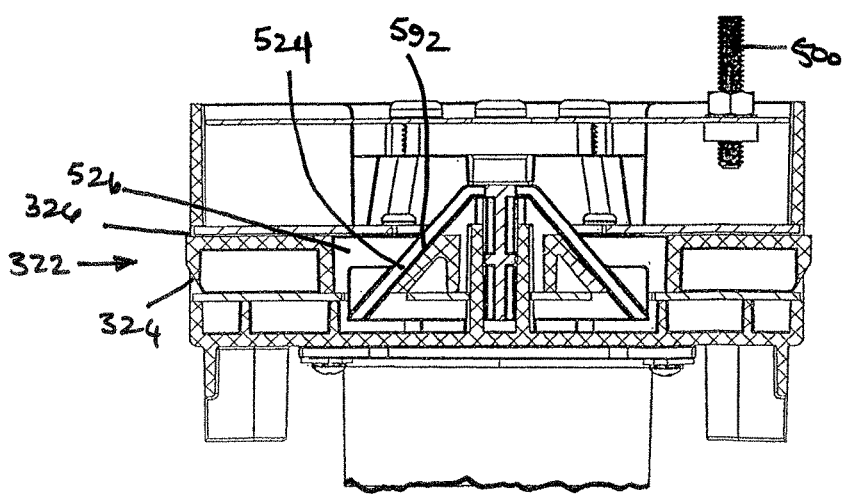
FIG. 9 is a cross-sectional view taken along line 9-9 showing the arrangement of the latch components used in the latch assembly for relative movement of these components to engage and disengage a frame for facilitating movement of the lower piston assembly.

As shown in FIGS. 7-9, the release probe 590 contacts an upper portion of the release component 522 to drive the corresponding flanges 524 downwardly against the corresponding bevels 592 in each of the slots 526 of the corresponding catches 322. Although it is a relatively small motion, it is sufficient to withdraw the catches 322 horizontally inwardly to disengage the outward portion of the catches from the corresponding apertures and plate 536. As the catches are withdrawn into the aperture 326, the frame 206 can be released from the forces driving the latch assembly 254. The plate 536 can be provided with a low friction surface on the portions that abut the catches 322 such as a Teflon coating or sheet applied to that surface.

The exemplification set out herein illustrates embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

What is claimed is:

1. A beverage brewing machine having a housing containing a beverage brewing apparatus, the beverage brewing apparatus providing mechanisms to function in a sequence of steps to minimize the time for producing a beverage from beverage brewing substance controllably combined with water, the brewing apparatus comprising:
    a brew chamber for receiving beverage brewing substance and water;
    an upper piston sized and configured for controllable movement into and out of the brewing chamber during a brewing cycle;
    a drive mechanism coupled to the upper piston and a controller for controllably operating the upward and downward movement of the upper piston;
    a vent valve communicating with the brewing chamber and coupled to the controller for controllably opening and closing the vent valve during a brewing cycle;
    a heated water delivery system coupled to the controller and communicating with the brew chamber for controllably delivering water to the brew chamber during at least a portion of the brewing cycle;
    a controllable brew chamber dispense valve coupled to the controller and communicating with the brew chamber for controllably opening and closing a passage from the brew chamber for dispensing of brewed beverage therefrom;
    a dispense line communicating with the brew chamber and a controllable vale coupled to the dispense line and the controller for use in controllably dispensing beverage from the brew chamber, and the system operates by positioning the upper piston at the start of a brew cycle out of the brew chamber to allow beverage brewing substance to be dispensed into the brew chamber, water is delivered from the heated water delivery system to the brew chamber simultaneous with the dispensing of brewing substance into the brew chamber to facilitate distribution and wetting of the brewing substance, at the conclusion of dispensing the brewing substance the piston is controllably moved downwardly into the brew chamber to seal the brew chamber, continued dispensing of heated water into the brew chamber occurs until a predetermined volume of water is achieved for use in at least partially saturating the brewing substance to facilitate extraction of brewed beverage therefrom, the piston is controllably moved upwardly in the brew chamber and not disengaged from the brew chamber during the brewing cycle to provide a volume within the sealed chamber for movement of the combination of water and brewing substance, continued dispensing of heated water into the brew chamber and controllable opening of the dispense valve on the dispense line initiates movement of brewed beverage out of the brew chamber through the dispensing line to a container, after conclusion of the brewing cycle the combination of brewing substance and water is compressed by controlled movement of the piston in the brew chamber to extract beverage therefrom and at least partially drain the brewing substance for subsequent disposal.

2. A method for operating a beverage brewing machine including an apparatus for brewing beverage within the machine comprising the following steps:

providing a brewing chamber;

providing a controllably moveable upper piston moveable into and out of the brewing chamber;

providing a drive mechanism coupled to the upper piston and coupled to a controller for controllably operating the upward and downward movement of the upper piston;

providing a heated water delivery system coupled to the controller for controllably delivering heated water to the brew chamber;

a vent valve coupled to and controllably communicating with the brew chamber and coupled to the controller for providing a path between the inside of the brew chamber and ambient atmosphere;

providing a controllable dispense valve coupled to and controllably communicating with the brew chamber and coupled to the controller for controllably dispensing brewed beverage from the chamber;

a brew chamber fill valve coupled to and controllably communicating with the brew chamber and coupled to the controller for controllably delivering water from the heated water delivery system to the brewed chamber;

providing a filter portion of the upper piston for filtering brewed beverage from brewing substance retained in the brewing chamber for extracting brewed beverage during a brewing cycle;

a lower piston coupled to the controller and controllably moveable through the brew chamber for facilitating movement of at least beverage brewing substance during the brewing cycle;

a brewing substance delivery assembly coupled to the controller and at least selectively communicating with the brew chamber for delivering brewing substance to the brew chamber for use in a brewing cycle;

initiating a brewing cycle using the controller and simultaneously operating the controllable brew chamber fill valve to introduce heated water into the brewing chamber while using the brewing substance delivery assembly to dispense beverage brewing substance into the brewing chamber;

simultaneously ceasing dispensing of brewing substance into the brewing chamber and operating the upper piston to move into the brewing chamber and seal the brewing chamber while controllably retaining the vent valve in an open condition;

moving the upper piston into the brewing chamber to a predetermined level while simultaneously controllably introducing water into the brewing chamber;

controllably operating the vent valve to close the brewing chamber communication with ambient atmosphere;

continuing the controllable dispensing of heated water into the brewing chamber and controllably operating the dispense valve for dispensing brewed beverage from the brewing chamber through a dispense line;

dispensing brewed beverage to a container;

providing a controllable drain valve coupled to the controller and communicating with the brew chamber;

controllably maintaining the drain valve in a closed position during the brewing cycle;

after a predetermined volume of water has been dispensed through the brewing chamber for combination with the brewing substance, operating the fill valve to a closed position to cease dispensing water into the brewing chamber;

during the process of saturating the brewing substance with water, while maintaining the vent valve closed for at least momentarily stopping the flow of water into the brewing chamber by operating the fill valve to a closed position, controllably operating the piston upwardly in the brewing chamber to draw a vacuum within the brewing chamber to facilitate extraction of flavor and other characteristics from the brewing substance into the heated water to enhance the brewing process;

after a predetermined time during which the vacuum is imposed on the brewing chamber and its contents, controllably opening the controllable dispense valve and at least driving the piston downwardly into the chamber to extract brewed beverage from the combination of brewing substance and heated water;

at the end of a predetermined volume of water dispensed through the brewing chamber, driving the upper piston downwardly to compress the contents of the brewing chamber against a lower piston to extract additional brewed beverage therefrom;

controllably operating the controllable dispense valve to a closed position and operating the upper piston and lower piston upwardly to move the used brewing substance from the brewing cycle to a position where it can be removed from the brewing chamber;

providing an ejection assembly for moving the spent brewing substance away from the brewing chamber; and after removing the spent brewing substance returning the upper piston to a position clear of the path through which brewing substance is dispensed into the brewing chamber for receiving brewing substance into the brewing chamber for the next brewing cycle.

* * * * *